(12) United States Patent
Petersen et al.

(10) Patent No.: US 12,475,476 B2
(45) Date of Patent: Nov. 18, 2025

(54) CLOSED-LOOP ENVIRONMENT FOR EFFICIENT, ACCURATE, AND SECURE TRANSACTION PROCESSING

(71) Applicant: Bakkt Marketplace, LLC, Atlanta, GA (US)

(72) Inventors: Christopher Michael Petersen, Lakeway, TX (US); Jeffrey Scott Pittelkau, Montgomery, AL (US); Nikolais Linsteadt, Applegate, CA (US); Joseph Arthur Revnes, Atlanta, GA (US); Brian Daniel Cooper, Marietta, GA (US); William Matthau, Laguna Niguel, CA (US); Yamini Bistesh Sagar, Alpharetta, GA (US); Nicolas Frederic Cabrera, Atlanta, GA (US); Utkarsh Agarwal, Tucson, AZ (US); Tim Kuchlein, Cupertino, CA (US); Bharath Lakshmanan, San Ramon, CA (US); William Andrew Bryant, Alpharetta, GA (US); Stephen Paul Saucier, Atlanta, GA (US); Deepak Kumar, Marietta, GA (US); Anil Jaiswal, Marietta, GA (US); Byungkwon Jeon, Cumming, GA (US); Balaji Devarasetty, Atlanta, GA (US)

(73) Assignee: Bakkt Marketplace, LLC, Atlanta, GA (US)

( * ) Notice: Subject to any disclaimer, the term of this patent is extended or adjusted under 35 U.S.C. 154(b) by 686 days.

(21) Appl. No.: 17/378,185

(22) Filed: Jul. 16, 2021

(65) Prior Publication Data
US 2022/0164815 A1 May 26, 2022

Related U.S. Application Data

(60) Provisional application No. 63/116,964, filed on Nov. 23, 2020.

(51) Int. Cl.
*G06Q 40/04* (2012.01)
*G06Q 30/0201* (2023.01)
*H04L 67/133* (2022.01)

(52) U.S. Cl.
CPC ..... *G06Q 30/0206* (2013.01); *G06Q 30/0201* (2013.01); *G06Q 40/04* (2013.01); *H04L 67/133* (2022.05)

(58) Field of Classification Search
None
See application file for complete search history.

(56) References Cited

U.S. PATENT DOCUMENTS 10,055,715 B1   8/2018   Grassadonia et al.
10,269,009 B1   4/2019   Winklevoss et al.
(Continued)

FOREIGN PATENT DOCUMENTS

WO   2017/070469 A1   4/2017
WO   2017/132333 A1   8/2017
(Continued)

OTHER PUBLICATIONS

Dashkevich, Natalia et al. "Blockchain Application For Central Banks: A Systemic Mapping Study," in IEEE Access, vol. 8, Jul. 27, 2020 (Year: 2020), pp. 139918-133952, DOI: 10.1109/ACCESS.2020.3012295.
(Continued)

*Primary Examiner* — Alan Torrico-Lopez
(74) *Attorney, Agent, or Firm* — ALSTON & BIRD LLP

(57) ABSTRACT

Various embodiments of the present disclosure provide methods, apparatuses, systems, devices, computing entities for managing digital asset transactions. An example method includes obtaining first current pricing data via an application programming interface, and providing the first current pricing data via a client device. The method further includes,
(Continued)

responsive to determining that a first configurable time period has elapsed: obtaining second current pricing data via an application programming interface, and providing the second current pricing data for display via the client device. The method further includes receiving a second transaction request and executing an off-chain digital asset transaction for the second transaction request between a central operating account and the internal user account within a second configurable time period. The method further includes dynamically providing a notification of execution of the off-chain digital asset transaction, and further generating and storing an account balance data object for the off-chain digital asset transaction.

15 Claims, 15 Drawing Sheets

(56) References Cited

U.S. PATENT DOCUMENTS

| | | | |
|---|---|---|---|
| 10,489,780 | B2 | 11/2019 | Miller et al. |
| 10,621,561 | B1 | 4/2020 | Brock et al. |
| 11,138,580 | B1 | 10/2021 | Koch |
| 11,288,660 | B1 | 3/2022 | Kurani |
| 11,501,370 | B1 | 11/2022 | Paya et al. |
| 11,810,190 | B2* | 11/2023 | Snyder ............... G06Q 40/02 |
| 2003/0115322 | A1 | 6/2003 | Moriconi et al. |
| 2007/0255662 | A1 | 11/2007 | Tumminaro |
| 2009/0119209 | A1 | 5/2009 | Sorensen et al. |
| 2013/0185186 | A1 | 7/2013 | Blackwood |
| 2015/0046241 | A1 | 2/2015 | Salmon et al. |
| 2015/0154572 | A1 | 6/2015 | von NotHaus et al. |
| 2015/0170112 | A1 | 6/2015 | Decastro |
| 2015/0213419 | A1 | 7/2015 | Lyons et al. |
| 2015/0262176 | A1 | 9/2015 | Langschaedel et al. |
| 2015/0332256 | A1 | 11/2015 | Minor |
| 2015/0363769 | A1 | 12/2015 | Ronca et al. |
| 2015/0363782 | A1 | 12/2015 | Ronca et al. |
| 2016/0203477 | A1 | 7/2016 | Yang et al. |
| 2016/0335628 | A1 | 11/2016 | Weigold |
| 2016/0371771 | A1 | 12/2016 | Serrano et al. |
| 2017/0221053 | A1 | 8/2017 | Goloshchuk |
| 2017/0330159 | A1 | 11/2017 | Castinado et al. |
| 2017/0357966 | A1 | 12/2017 | Chandrasekhar et al. |
| 2018/0268382 | A1 | 9/2018 | Wasserman |
| 2019/0034984 | A1 | 1/2019 | Lee et al. |
| 2019/0073666 | A1 | 3/2019 | Ortiz et al. |
| 2019/0139033 | A1 | 5/2019 | Ricotta et al. |
| 2019/0139037 | A1 | 5/2019 | Khalil et al. |
| 2019/0220856 | A1 | 7/2019 | Li et al. |
| 2019/0236593 | A1* | 8/2019 | Vorobyev ........... G06Q 20/3829 |
| 2019/0236594 | A1 | 8/2019 | Ehrlich-Quinn |
| 2019/0266606 | A1* | 8/2019 | Zhuang ................ G06Q 20/382 |
| 2019/0303887 | A1 | 10/2019 | Wright et al. |
| 2019/0303888 | A1 | 10/2019 | Hamasni et al. |
| 2019/0303921 | A1* | 10/2019 | Mutter .................. G06F 3/0655 |
| 2019/0303922 | A1 | 10/2019 | Hamasni et al. |
| 2019/0332691 | A1 | 10/2019 | Beadles et al. |
| 2019/0354945 | A1 | 11/2019 | Mahajan et al. |
| 2020/0019937 | A1 | 1/2020 | Edwards et al. |
| 2020/0034869 | A1 | 1/2020 | Harrison |
| 2020/0042996 | A1* | 2/2020 | Mayblum .............. G06Q 20/10 |
| 2020/0042998 | A1* | 2/2020 | Mendhi .............. G06Q 20/0658 |
| 2020/0074464 | A1 | 3/2020 | Trevethan |
| 2020/0175506 | A1 | 6/2020 | Snow |
| 2020/0195652 | A1 | 6/2020 | Carnahan et al. |
| 2020/0211098 | A1 | 7/2020 | Miyamoto et al. |
| 2020/0265516 | A1 | 8/2020 | Xu |
| 2020/0279249 | A1 | 9/2020 | Ta |
| 2020/0334668 | A1 | 10/2020 | Nicli et al. |
| 2020/0364686 | A1 | 11/2020 | Millius et al. |
| 2020/0380476 | A1 | 12/2020 | Trudeau et al. |
| 2021/0012420 | A1 | 1/2021 | Balakrishnan |
| 2021/0082044 | A1 | 3/2021 | Sliwka et al. |
| 2021/0083845 | A1 | 3/2021 | Sen et al. |
| 2021/0119807 | A1 | 4/2021 | Chen et al. |
| 2021/0150586 | A1 | 5/2021 | Tran |
| 2021/0357917 | A1* | 11/2021 | Dalton ................ G06Q 20/363 |
| 2021/0398211 | A1 | 12/2021 | Maathur et al. |
| 2022/0122062 | A1 | 4/2022 | Mayblum et al. |
| 2022/0188780 | A1 | 6/2022 | Cabrera et al. |
| 2022/0188781 | A1 | 6/2022 | El-Bizri |
| 2022/0188811 | A1 | 6/2022 | Petersen et al. |
| 2022/0188812 | A1 | 6/2022 | Petersen et al. |
| 2022/0188917 | A1 | 6/2022 | Petersen et al. |
| 2022/0237597 | A1 | 7/2022 | Petersen et al. |
| 2022/0237598 | A1 | 7/2022 | Cabrera et al. |
| 2022/0237599 | A1 | 7/2022 | Petersen et al. |
| 2024/0095723 | A1 | 3/2024 | Petersen et al. |
| 2024/0311805 | A1 | 9/2024 | Petersen et al. |

FOREIGN PATENT DOCUMENTS

| | | |
|---|---|---|
| WO | WO-2019/222432 A1 | 11/2019 |
| WO | 2020/049442 A1 | 3/2020 |

OTHER PUBLICATIONS

Final Office Action for U.S. Appl. No. 17/378,250, dated Mar. 3, 2023, (20 pages), United States Patent and Trademark Office, US.

NonFinal Office Action for U.S. Appl. No. 17/377,178, dated Feb. 16, 2023, (20 pages), United States Patent and Trademark Office, US.

NonFinal Office Action for U.S. Appl. No. 17/460,799, dated Mar. 1, 2023, (22 pages), United States Patent and Trademark Office, US.

Proskuryakov, Alexander et al. "Predictive-Free Methods for Digital Financial Asset Management and Delayed Functional-Differential Economic Game Models," 2021 International Conference On Information Technology and Nontechnology (ITNT), pp. 1-4, Samara, Russian Federation, XPLORE IEEE, Date of Conference: Sep. 20-24, 2021 (Year: 2021), DOI: 10.1109/ITNT52450.2021.9649433.

Final Office Action for U.S. Appl. No. 17/460,799, dated Jun. 22, 2023, (12 pages), United States Patent and Trademark Office, US.

NonFinal Office Action for U.S. Appl. No. 17/397,810, dated Aug. 15, 2023, (26 pages), United States Patent and Trademark Office, US.

International Searching Authority, International Search Report and Written Opinion for International Application No. PCT/US2021/050066, dated Nov. 24, 2021, (15 pages), European Patent Office, Rijswijk, Netherlands.

Final Office Action for U.S. Appl. No. 17/407,962, dated Apr. 25, 2023, (29 pages), United States Patent and Trademark Office, US.

International Searching Authority, International Search Report and Written Opinion for International Application No. PCT/US2021/043168, dated Nov. 12, 2021, (15 pages).

International Searching Authority, International Search Report and Written Opinion for International Application No. PCT/US2021/043173, dated Nov. 12, 2021, (17 pages).

International Searching Authority, International Search Report and Written Opinion for International Application No. PCT/US2021/043184, dated Nov. 16, 2021, (17 pages).

International Searching Authority, International Search Report and Written Opinion for International Application No. PCT/US2021/050135, dated Jan. 3, 2022, (14 pages), European Patent Office, Rijswijk, Netherlands.

International Searching Authority, International Search Report and Written Opinion for International Application No. PCT/US2021/050137, dated Jan. 3, 2022, (14 pages), European Patent Office, Rijswijk, Netherlands.

International Searching Authority, International Search Report and Written Opinion for International Application No. PCT/US2021/050043, dated Jan. 10, 2022, (16 pages), European Patent Office, Rijswijk, Netherlands.

NonFinal Office Action for U.S. Appl. No. 17/407,962, dated Sep. 21, 2022, (53 pages), United States Patent and Trademark Office, US.

(56) References Cited

OTHER PUBLICATIONS

NonFinal Office Action for U.S. Appl. No. 17/407,962, dated Nov. 14, 2023 (33 pages), United States Patent and Trademark Office, US.
NonFinal Office Action for U.S. Appl. No. 17/460,799, dated Oct. 12, 2023, (23 pages), United States Patent and Trademark Office, US.
Dashkevich, Natalia et al. "Blockchain Application For Central Banks: A Systemic Mapping Study," IEEE Access, Jul. 27, 2020, DOI: 10.1109/ACCESS.2020.3012295.
NonFinal Office Action for U.S. Appl. No. 17/378,250, dated Aug. 5, 2022, (40 pages), United States Patent and Trademark Office, US.
Proskuryakov, Alexander et al. "Predictive-Free Methods for Digital Financial Asset Management and delayed Functional-Differential Economic Game Models," XPLORE IEEE. 2021 International Conference On Information Technology and Nanotechnology (ITNT), Sep. 20-24, 2021, DOI: 10.1109/ITNT52450.2021.9649433.
International Searching Authority, International Search Report and Written Opinion for International Application No. PCT/US2021/049625, dated Dec. 21, 2021, (16 pages), European Patent Office, Rijswijk, Netherlands.
Final Rejection Mailed on May 14, 2024 for U.S. Appl. No. 17/407,962, 41 page(s).
Final Rejection Mailed on May 9, 2024 for U.S. Appl. No. 17/460,799, 11 page(s).
Non-Final Rejection Mailed on Mar. 15, 2024 for U.S. Appl. No. 17/397,810, 16 page(s).
Non-Final Rejection Mailed on Mar. 28, 2024 for U.S. Appl. No. 17/460,810, 14 page(s).
Non-Final Rejection Mailed on Oct. 1, 2024 for U.S. Appl. No. 17/460,799, 15 page(s).
Final Rejection Mailed on Mar. 5, 2025 for U.S. Appl. No. 17/460,799, 13 page(s).
Non-Final Rejection Mailed on Dec. 16, 2024 for U.S. Appl. No. 17/407,962, 37 page(s).
Non-Final Rejection Mailed on Feb. 6, 2025 for U.S. Appl. No. 17/397,810, 16 page(s).
Non-Final Rejection Mailed on Feb. 14, 2025 for U.S. Appl. No. 18/520,775, 16 page(s).
Non-Final Rejection Mailed on Jan. 23, 2025 for U.S. Appl. No. 17/460,810, 17 page(s).
Stankov, et al., "Cryptocurrency—A Curious Event in Modern Day Society", Proc. XXXIII International Scientific Conference Electronics, (6 pages), Sep. 17, 2024.
Zhang, et al., "A Hybrid Model for Central Bank Digital Currency Based on Blockchain", IEEE Access, vol. 9, (13 pages), Apr. 5, 2021, doi: 10.1109/ACCESS.2021.3071033.
Final Rejection Mailed on Sep. 18, 2025 for U.S. Appl. No. 17/460,810, 16 page(s).

* cited by examiner

US 12,475,476 B2

CLOSED-LOOP ENVIRONMENT FOR EFFICIENT, ACCURATE, AND SECURE TRANSACTION PROCESSING

CROSS-REFERENCE TO RELATED APPLICATIONS

This application claims the benefit of U.S. Provisional Patent Application Ser. No. 63/116,964 filed on Nov. 23, 2020, which is incorporated herein by reference in its entirety, including any figures, tables, drawings, and appendices.

TECHNOLOGICAL FIELD

Embodiments of the present disclosure generally relate to executing transactions that may or may not be recorded in a distributed ledger system.

BACKGROUND

Various embodiments of the present disclosure address technical challenges related to managing the processing of and improving the efficiency and transaction speed for executing digital asset transactions (e.g., buying, selling, transferring).

BRIEF SUMMARY

In general, embodiments of the present disclosure provide methods, apparatus, systems, computing devices, computing entities, and/or the like for managing transactions for full or fractional digital assets (e.g., including cryptoassets or cryptocurrencies). Various embodiments of the present disclosure further provide technical advantages by improving processing efficiency and speed of transactions by executing off-chain, closed loop digital asset transactions. In various embodiments, such off-chain digital asset transactions are executed without requiring a distributed ledger public key, address, identifier, and/or the like to execute or commit a transaction. For example, various embodiments provide a closed loop environment within which client devices 104 may request the purchase and/or the sale of digital asset units with an account management system. In various embodiments, the account management system 102 may be configured to initiate, request, and/or execute off-chain digital asset transactions and store off-chain transaction record data objects, while also being configured to initiate, request, and/or execute on-chain digital asset transactions and commit on-chain (e.g., external) transaction record data objects via a distributed ledger computing platform 110. In various embodiments, the account management system 102 is also configured to provide up-to-date and current pricing data for digital assets to client devices 104, thereby enabling users of the client devices 104 to request and initiate well-informed transactions.

In accordance with one aspect, a computer-implemented method is provided. The computer-implemented method includes generating and transmitting a first current pricing data application programming interface (API) request. The first current pricing API request is associated with a first transaction request at a first timepoint and an internal user account identifiable by an internal account identifier. The first current pricing API request indicates a digital asset associated with the first transaction request, and the first transaction request indicates a first number of digital asset units. The computer-implemented method further includes receiving a first current pricing data API response including first current pricing data and providing the first current pricing data for display via a client device. The computer-implemented method further includes, responsive to determining that a first configurable time period has elapsed: generating and transmitting a second current pricing data API request, the second current pricing API request indicating the digital asset, receiving a second current pricing data API response including second current pricing data, and providing the second current pricing data for display via the client device.

The computer-implemented method further includes receiving a second transaction request. The second transaction request is at a second timepoint, is associated with the internal user account identifiable by the internal account identifier, and indicates a second number of digital asset units. The computer-implemented method further includes executing an off-chain digital asset transaction for the second transaction request within a second configurable time period. The off-chain digital asset transaction for the second number of digital asset units is between a central operating account and the internal user account. The computer-implemented method further includes dynamically providing a notification of execution of the off-chain digital asset transaction, and further generating and storing an account balance data object for the off-chain digital asset transaction.

In accordance with another aspect, a system including one or more memory storage areas and one or more processors is provided. The system is configured for generating and transmitting a first current pricing data API request. The first current pricing API request is associated with a first transaction request at a first timepoint and an internal user account identifiable by an internal account identifier. The first current pricing API request indicates a digital asset associated with the first transaction request, and the first transaction request indicates a first number of digital asset units. The system is further configured for receiving a first current pricing data API response including first current pricing data and providing the first current pricing data for display via a client device. The system is further configured for, responsive to determining that a first configurable time period has elapsed: generating and transmitting a second current pricing data API request, the second current pricing API request indicating the digital asset, receiving a second current pricing data API response including second current pricing data, and providing the second current pricing data for display via the client device.

The system is further configured for receiving a second transaction request. The second transaction request is at a second timepoint, is associated with the internal user account identifiable by the internal account identifier, and indicates a second number of digital asset units. The system is further configured for executing an off-chain digital asset transaction for the second transaction request within a second configurable time period. The off-chain digital asset transaction for the second number of digital asset units is between a central operating account and the internal user account. The system is further configured for dynamically providing a notification of execution of the off-chain digital asset transaction, and further generating and storing an account balance data object for the off-chain digital asset transaction.

In accordance with yet another aspect, a computer program product is provided. The computer-program product includes at least one non-transitory computer-readable storage medium having computer-readable program code portions stored therein. The computer-readable program code portions include executable portions configured for generating and transmitting a first current pricing data API request. The first current pricing API request is associated with a first transaction request at a first timepoint and an internal user account identifiable by an internal account identifier. The first current pricing API request indicates a digital asset associated with the first transaction request, and the first transaction request indicates a first number of digital asset units. The computer-readable program code portions further include executable portions configured for receiving a first current pricing data API response including first current pricing data and providing the first current pricing data for display via a client device. The computer-readable program code portions further include executable portions configured for, responsive to determining that a first configurable time period has elapsed: generating and transmitting a second current pricing data API request, the second current pricing API request indicating the digital asset, receiving a second current pricing data API response including second current pricing data, and providing the second current pricing data for display via the client device.

The computer-readable program code portions further include executable portions configured for receiving a second transaction request. The second transaction request is at a second timepoint, is associated with the internal user account identifiable by the internal account identifier, and indicates a second number of digital asset units. The computer-readable program code portions further include executable portions configured for executing an off-chain digital asset transaction for the second transaction request within a second configurable time period. The off-chain digital asset transaction for the second number of digital asset units is between a central operating account and the internal user account. The computer-readable program code portions further include executable portions configured for dynamically providing a notification of execution of the off-chain digital asset transaction, and further generating and storing an account balance data object for the off-chain digital asset transaction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figures 5A, 5B:
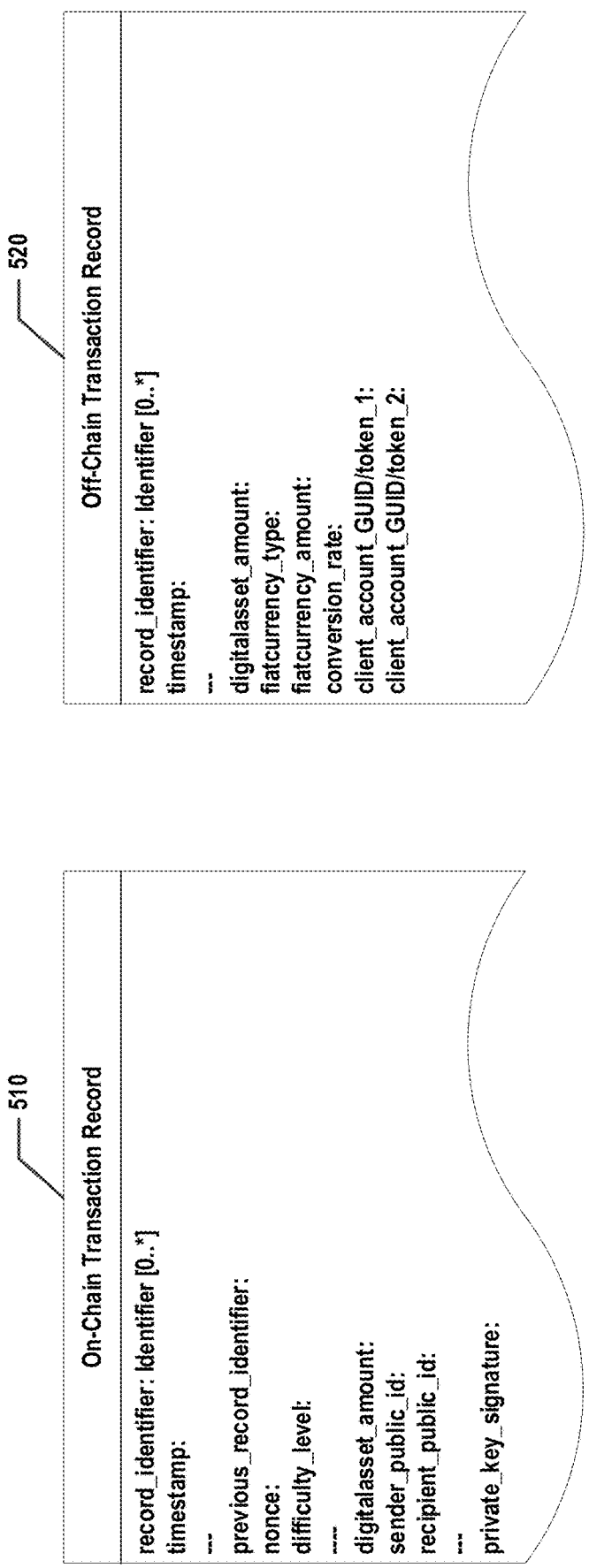
Figure 7A:
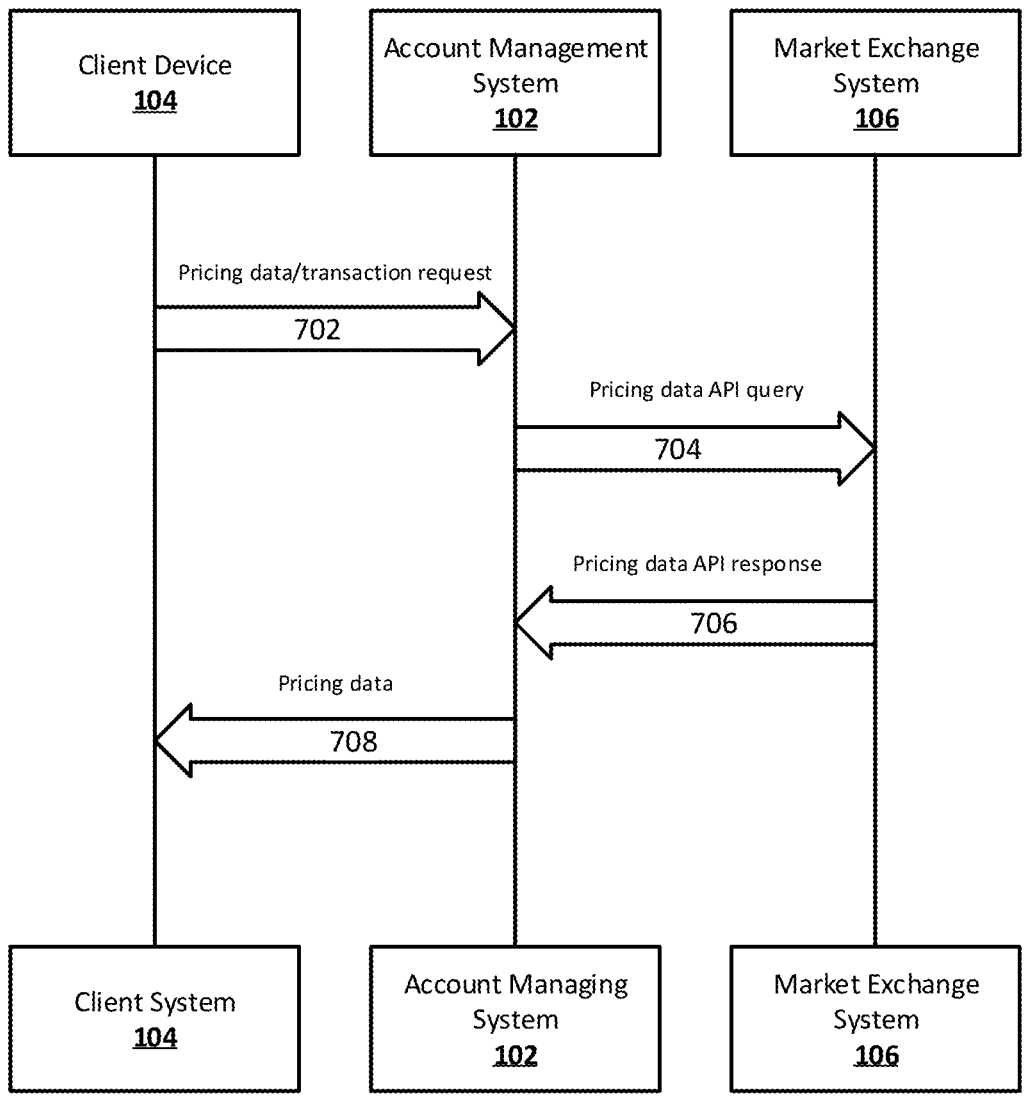
Figure 7B:
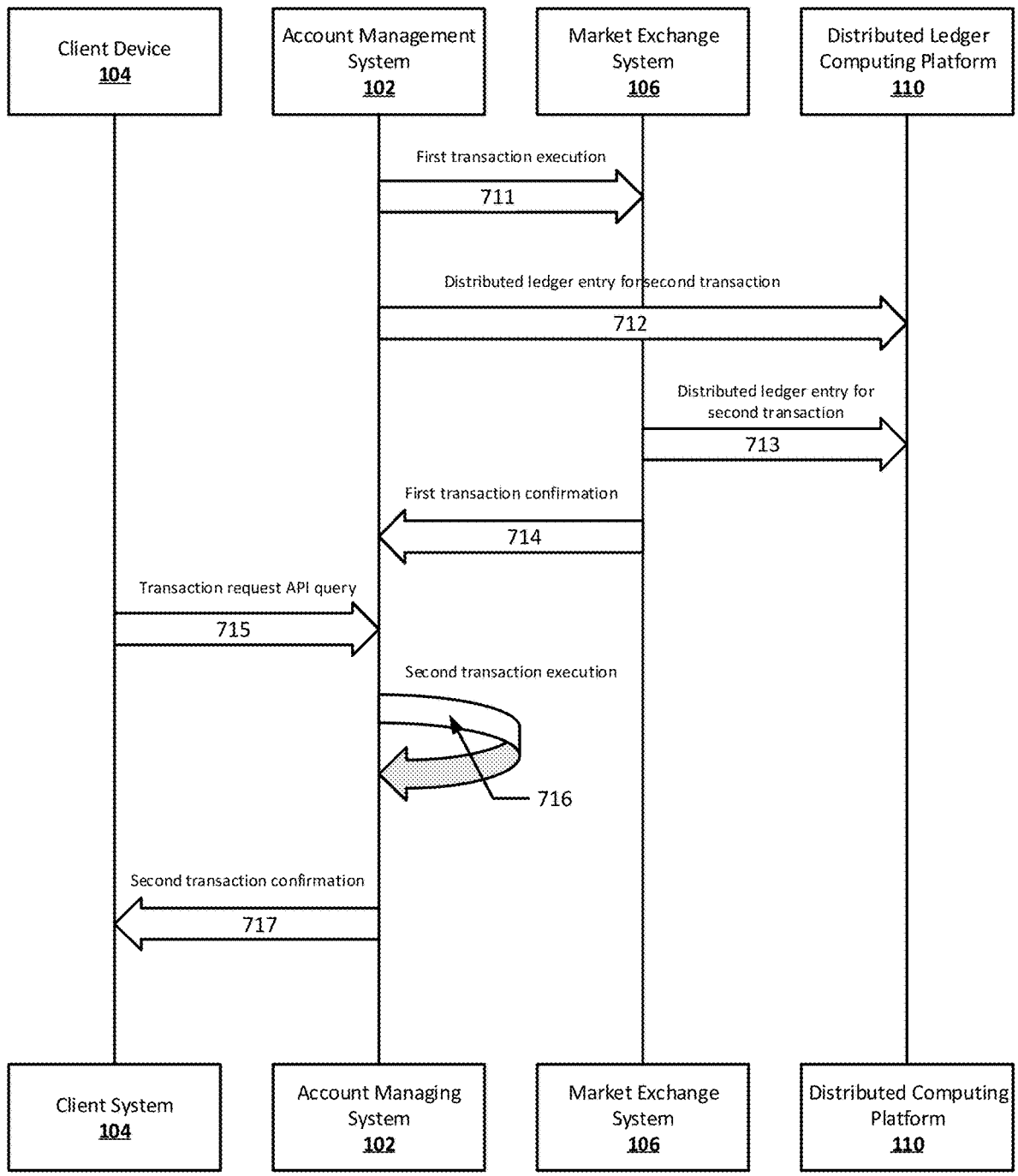
Figure 7C:
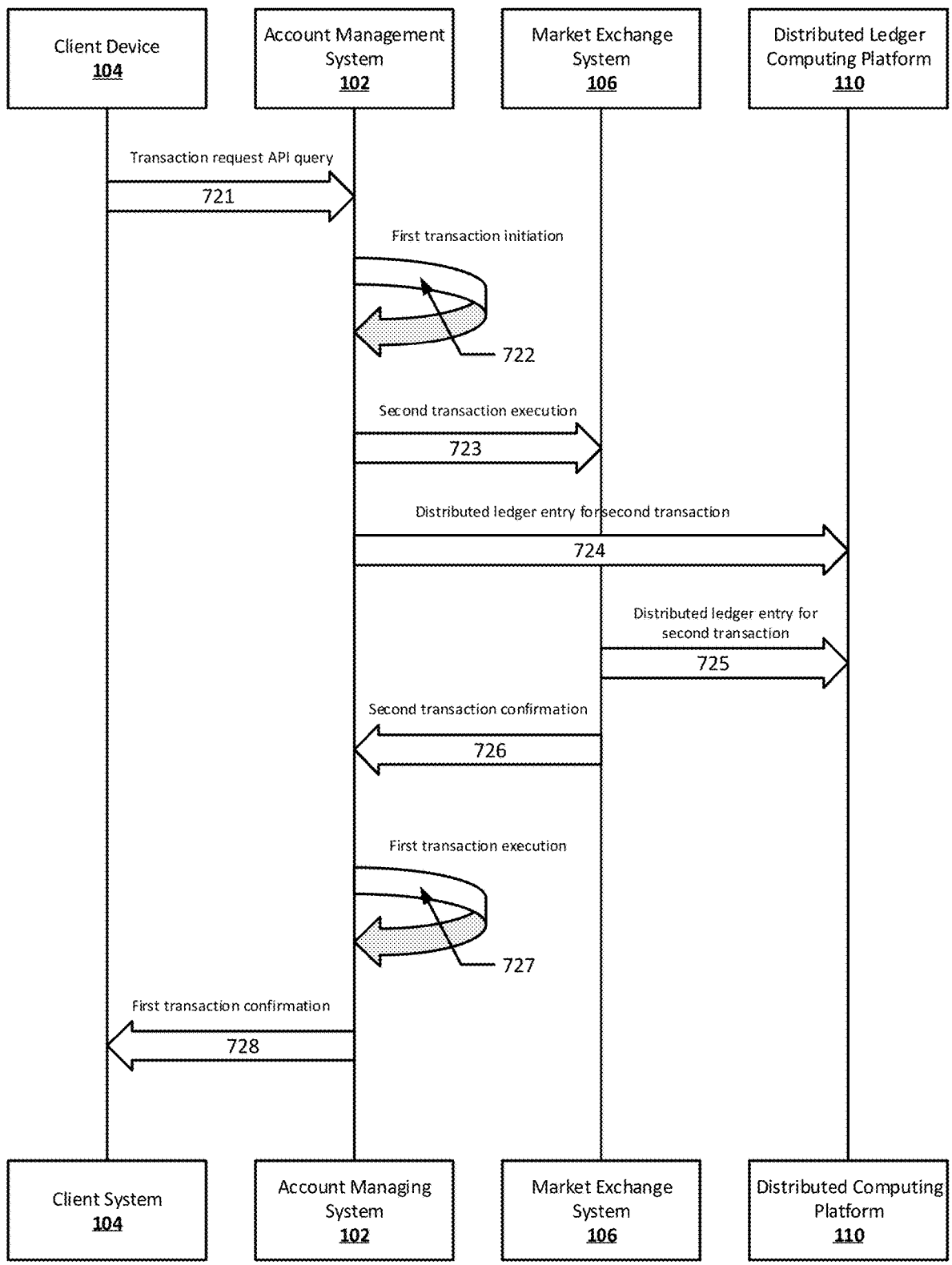
Figure 8:
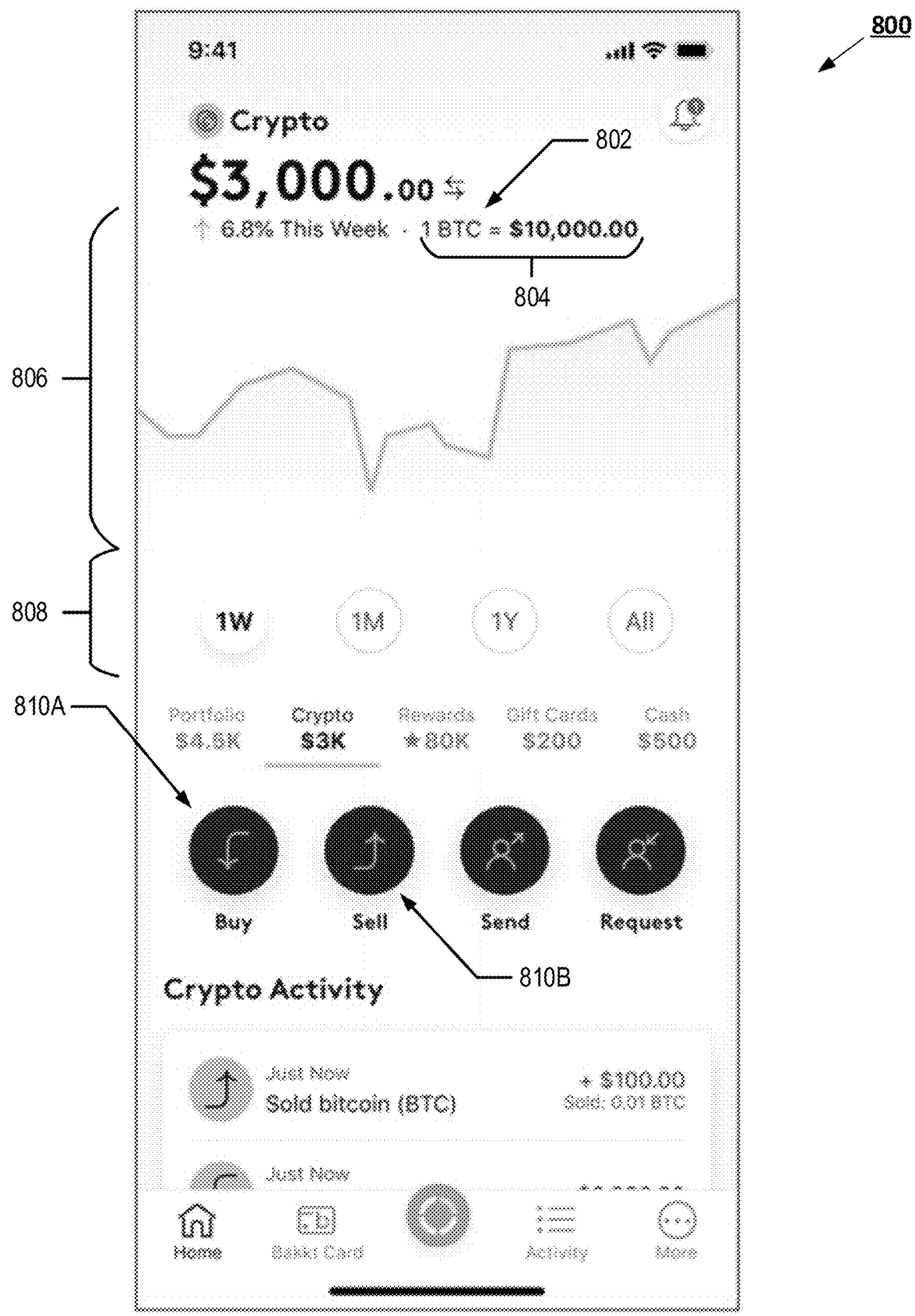
Figure 9:
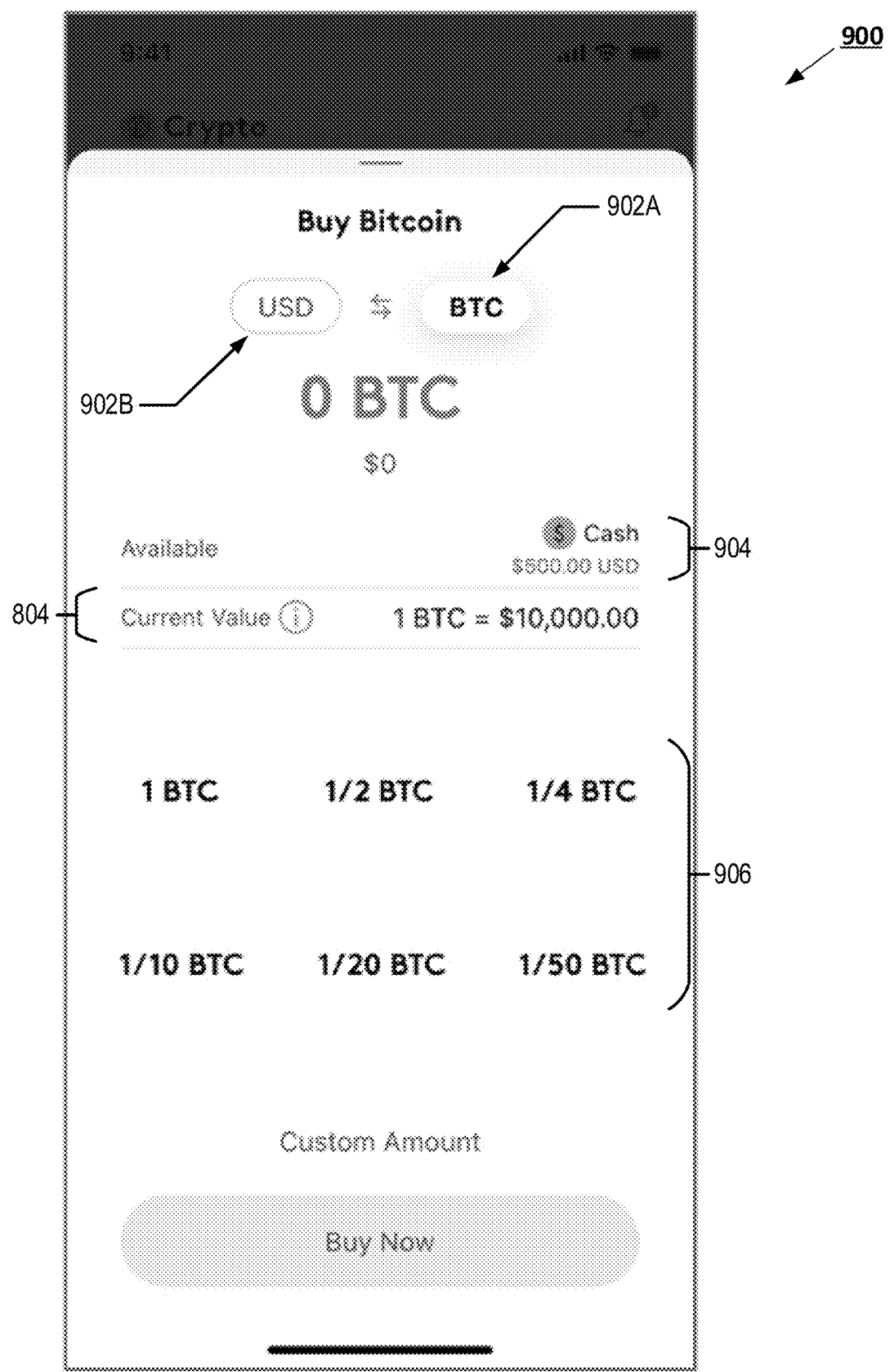
Figure 10:
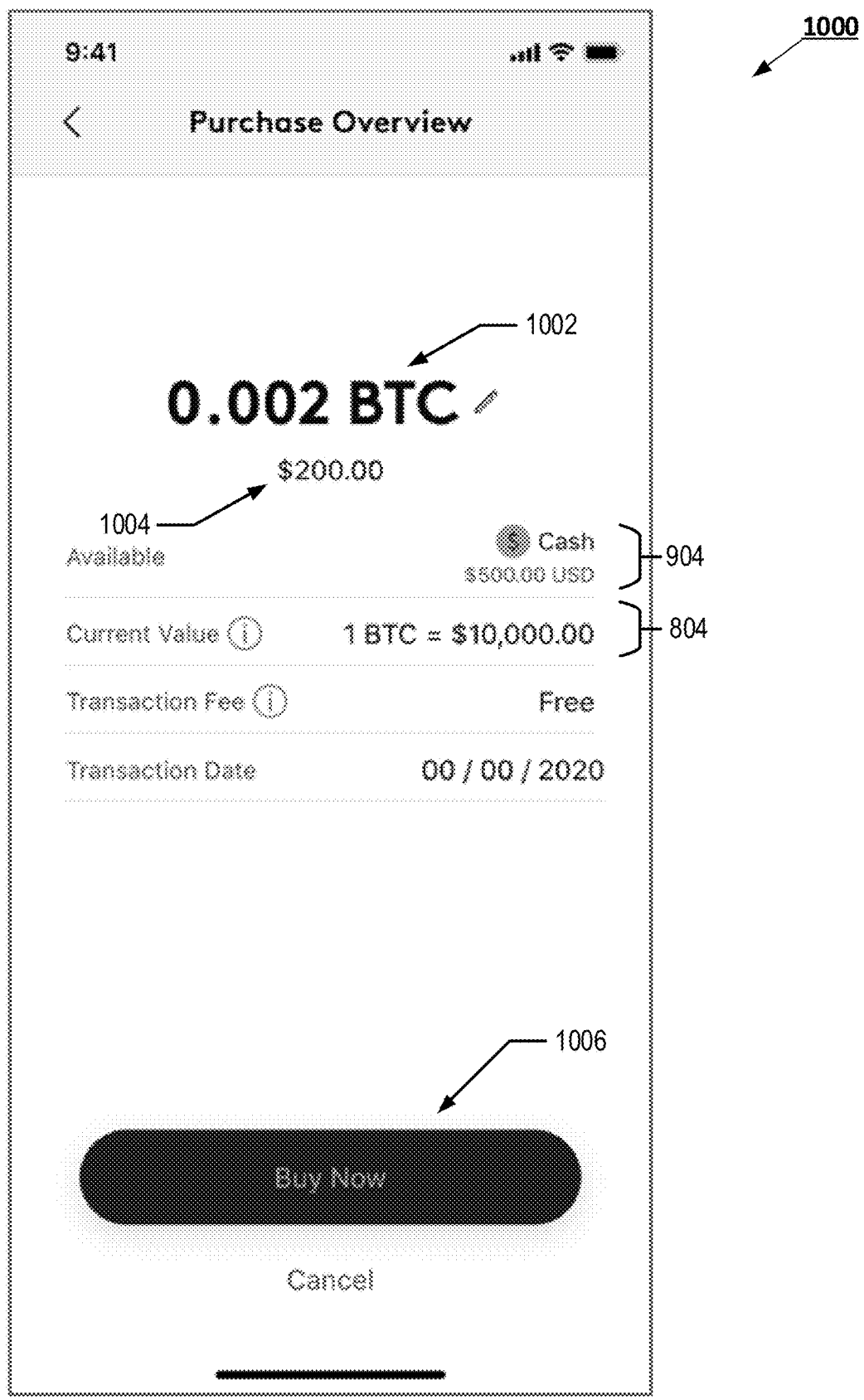

FIGS. 5A-B provide diagrams of example transaction record data objects, in accordance with various embodiments of the present disclosure;

FIGS. 6A-D provide process flows for managing client accounts and executing transactions in an account management system, in accordance with various embodiments of the present disclosure;

FIGS. 7A-C provide messaging flows for managing client accounts and executing transactions in an account management system, in accordance with various embodiments of the present disclosure;

FIG. 8 provides an example interface for executing transactions for a client account, in accordance with various embodiments of the present disclosure;

FIG. 9 provides an example interface for executing transactions for a client account, in accordance with various embodiments of the present disclosure; and FIG. 10 provides an example interface for executing transactions for a client account, in accordance with various embodiments of the present disclosure.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW AND TECHNICAL ADVANTAGES

Various embodiments of the present disclosure provide technical solutions for managing digital asset transactions. In various embodiments, an account management system 102 may be configured to initiate, request, and/or execute off-chain digital asset transactions for a client device. Accordingly, in various embodiments, client devices 104 may purchase, sell, and/or transfer digital asset units in real-time without significant processing and/or transaction delays. Furthermore, various embodiments enable clients systems to purchase, sell, and/or transfer digital asset units without a distributed ledger public key, address, identifier, and/or the like. In various embodiments, off-chain digital asset transactions are executed in a closed loop environment, such that digital asset units may be purchased from the custody of an account management system 102 and may be sold to the custody of the account management system. In such embodiments, the closed loop environment enables improved processing speeds of digital asset transactions, as the off-chain transactions are not committed to a distributed ledger. Meanwhile, the account management system 102 may be configured to initiate, request, and/or execute on-chain digital asset transactions with entities external to the closed loop environment, such as a market exchange system 106. For example, the account management system 102 may maintain a digital asset central operating account from which client devices 104 may purchase digital asset units and/or to which client devices 104 may sell digital asset units.

It will be understood then that by enabling off-chain digital asset transactions for one or more client devices 104, various embodiments of the present disclosure provide technical advantages and improvements by improving transaction processing efficiency and speed. In existing methods and systems, digital asset transactions are processed at a relatively low rate, and the processing of digital asset transactions may be severely constrained by distributed ledger block sizes, block generation times, relay or broadcast times, and/or the like. However, in various embodiments of the present disclosure, an account management system 102 may enable, execute, process, record, and/or the like multiple digital asset transactions with many client devices 104 in real-time in an off-chain manner, thereby surpassing such constraints. Responsive to a transaction request by a client device, digital asset units may be transferred to and/or from a client account within the closed loop environment in real-time or substantially real-time, and such a transaction may be executed and processed efficiently and with reduced computational resources. Thus, various embodiments of the present disclosure may improve the processing efficiency and transaction speed for executing digital asset transactions.

Furthermore, various embodiments provide technical advantages and improvements by continuously and periodically providing pricing data to client devices 104, such that end users of the client devices 104 may initiate well-informed digital asset transactions. It may be understood that various digital assets appreciate and depreciate in value over time, and a conversion rate, exchange rate, equivalence relationship, and/or similar words used herein interchangeably between a digital asset and fiat currency (e.g., US dollars, EU euros, Chinese yen, English pounds) may vary substantially over time. Thus, in various embodiments, pricing data may be obtained using one or more automated timing triggers and provided to client devices 104, such that current information and pricing data is used when initiating and executing digital asset transactions.

Further still, various embodiments provide technical advantages and improvement by maintaining a configurable digital asset unit balance in a digital asset central operating account at all times to accommodate any number of off-chain digital asset transaction requests, or unit magnitudes thereof. Various embodiments may comprise, train, and use various predictive models, optimization models, machine learning models, and/or the like to generate predictions for a future digital asset unit balance for a digital asset central operating account based at least in part on various factors such as digital asset demand, digital asset pricing data, a number of active client devices, time of day, and/or the like, and using such predictions, on-chain digital asset transactions may be executed in order to maintain a configurable digital asset unit balance in a digital asset central operating account in anticipation or preparation for a predicted number of off-chain digital asset transaction requests or unit magnitudes thereof. In various embodiments, training and use of such various models may involve on-chain and/or off-chain transaction record data objects describing executed on-chain and off-chain digital asset transactions and each associated with a time point.

Further technical advantages are provided due at least in part on to a closed loop environment managed and controlled by a central entity. Existing methods and systems for managing a digital asset, such as methods and systems involving a distributed ledger, expose important information regarding transactions, number of transactions, transaction amounts, transaction parties, and/or the like to a large amount of entities. Various embodiments described herein provide security and enable execution of secure transactions within a closed loop environment managed by a central entity. Further, due to management of the closed loop environment by a central entity, accuracy of various transactions may be verified efficiently and rapidly. In contrast, existing methods and systems for managing a digital asset (e.g., managing a cryptoasset using a distributed ledger) may rely on multiple parties or entities to all verify various transactions, resulting in inefficient and slow transaction processing. For example, the processing of transactions in existing methods and systems may be performed on a scale of hours (e.g., 72 hours), while the present disclosure provides various embodiments in which transaction processing may be performed on a scale of seconds or milliseconds.

II. EXEMPLARY DEFINITIONS

The term "digital asset" may refer to any asset or currency of a digital form and/or exchanged digitally. Digital assets may be managed in a decentralized manner using cryptography and distributed ledgers. In such embodiments, the distributed ownership of digital asset among various participants is recorded via a distributed ledger (e.g., a blockchain), wherein cryptographic public keys and cryptographic private keys corresponding to individual participants are used to convey ownership of a number of digital asset units and to grant authority to transact with an owned number of digital asset units. The cryptographic public keys and cryptographic private keys are generated and interrelated based at least in part on cryptographic functions or algorithms. Specifically, a cryptographic public key and a cryptographic private key are paired. Due to its decentralized nature, a digital asset is not managed or controlled by a central entity. Digital assets are unmanaged in that balances of digital assets are committed and recorded to a decentralized distributed ledger (e.g., a blockchain). A digital asset may be associated with transactional value and may be used for the purchase of goods and services. A digital asset may specifically be associated with a value with respect to a fiat currency, and such a value may vary over time. Exemplary digital assets may include non-fungible tokens (NFTs) and various cryptocurrencies or cryptoassets such as Bitcoin (BTC), Ethereum, Ripple, Litecoin, Filecoin, Dogecoin, and/or the like. A digital asset may be quantified, managed, transacted, and/or the like based at least in part on full and/or fractional units. For example, a digital asset transaction may involve 1 BTC unit (full unit), while another digital asset transaction may involve 0.4 BTC units (fractional units).

The term "fiat currency" may refer to a currency that is not necessarily related to or backed by a physical commodity. A fiat currency may be centrally managed and distributed by a central entity. Examples of fiat currencies may include U.S. dollars, European Union euros, Chinese yen, English pounds, and/or the like that are managed and distributed by respective governments. The central entity managing a fiat currency may have the authority to increase and/or decrease the supply of a fiat currency. A fiat currency has inherent transactional value, which may be based at least in part on a relationship between the supply of the fiat currency and the demand of the fiat currency. Thus, the value of fiat currency may be managed by a central entity. The value of fiat currency may be used as a reference for evaluating a variable value of digital asset.

The term "distributed ledger" may refer to an electronically-stored data structure, data object, database, and/or the like that may record transactions made for digital asset transactions. A distributed ledger may be consensually shared, acknowledged, synchronized, and verified by multiple participants, and may be decentralized such that a central or single entity does not manage the distributed ledger. Each recorded transaction in a distributed ledger may be verified and acknowledged by all participants. Specifically, recorded transactions may be verified, acknowledged, and added to a distributed ledger based at least in part on cryptographic public keys, or distributed ledger public key values, and cryptographic private keys, or distributed ledger private key values. For example, distributed ledger public key values may be used to identify entities transacting on a digital asset, and distributed ledger private key values may be used to convey the authority of such entities to transact on the digital asset.

The term "on-chain transaction" may generally refer to a transaction executed and recorded on a distributed ledger (e.g., a blockchain). An on-chain transaction may specifically be executed by committing an on-chain (e.g., external) transaction record to a distributed ledger. As such, all participants of the distributed ledger may be aware of the on-chain transaction, and the on-chain transaction may be verified based at least in part on multiple participants being aware of the on-chain transaction. An on-chain transaction may also be permanently recorded in a distributed ledger.

The term "off-chain transaction" may generally refer to a transaction executed external to a digital asset network and not recorded on a distributed ledger (e.g., a blockchain). As such, the off-chain transaction may be agreed upon and verified by the entities involved in the off-chain transaction, but the off-chain transaction may be unknown to participants of the distributed ledger who are not involved in the off-chain transaction. An off-chain transaction may rely on external validation methods, as an off-chain transaction is not recorded on a distributed ledger and may not be verified or validated based at least in part on distributed ledger public key values or distributed ledger private key values.

The term "closed loop digital asset environment" may describe an environment, ecosystem, system, platform, economy, and/or the like within which a total supply of a digital asset and/or number of respective digital asset units may be distributed among members of the closed loop digital asset environment. Accordingly, members of the closed loop digital asset environment may purchase or sell digital asset units with other members, as the total supply of the closed loop digital asset environmental remains the same. Members of the closed loop digital asset environment may be restricted to purchasing digital asset units only from a central operating or managing entity of the closed loop digital asset environment, and likewise may be restricted to selling digital asset units only to the central operating or managing entity. Thus, the closed loop digital asset environment may be a centralized environment. However, digital asset units may not be transferred externally to the closed loop digital asset environment by the members. Rather, the digital asset units can only be transferred externally by the central operating or managing entity of the closed loop environment.

The term "pricing data" may refer to data describing a value (e.g., a transactional value) of a digital asset and/or a fiat currency. Such pricing data may describe a value of a digital asset with respect to a fiat currency and/or a value of a fiat currency with respect to a digital asset. Such pricing data may also describe a standard value of a digital asset and/or a fiat currency, for example, a value with respect to gold or a physical commodity. For example, pricing data may comprise a conversion rate, an exchange rate, an equivalence relationship, and/or the like describing a number of fiat currency units equal in value to one digital asset unit. Such pricing data may be historical, indicative, current, and/or real-time. In one example, historical or indicative pricing data may describe the variable value of a digital asset and/or a fiat currency over a time period. Accordingly, portions of pricing data may be associated with a timepoint or be labelled with timestamps. Similarly, current or real-time pricing data may describe the value of a digital asset and/or a fiat currency at a present moment in time.

The term "account balance data object" may refer to a data entity configured to describe at least a number of currency units stored in, associated with, and/or linked to an account. By extension, an account balance data object may indicate the number of currency units owned by an entity (e.g., an end user) associated with the account. An account balance data object may comprise additional information for a corresponding account, such as global or account-specific account identifiers, historical balance data, owner entity credentials, and/or the like. An account balance data object may comprise data specific to a currency and/or an asset, such as a fiat currency and/or a digital asset. Thus, when a user account is referenced herein, one or more account balance data objects may be used to record transactions associated with the user account. Such an account balance data object may include the entities, the digital assets, the digital asset units, the fiat currencies, the fiat currency units, a conversion rate, a cost basis, an exchange rate, an equivalence relationship, timestamps, and/or the like.

The term "on-chain transaction record data object" may refer to a data entity configured to describe at least a number of digital asset units purchased, sold, or transferred via a distributed ledger platform as recorded and stored by the account management system. Such a transaction data object may include the entities, the digital assets, the digital asset units, the fiat currencies, the fiat currency units, a conversion rate, a cost basis, an exchange rate, an equivalence relationship, timestamps, any applicable keys or key references, and/or the like.

The term "off-chain transaction record data object" may refer to a data entity configured to describe at least a number of currency units purchased, sold, or transferred via the account management system but that are not reflected by the distributed ledger platform. Such a transaction data object may include the entities, the digital assets, the digital asset units, the fiat currencies, the fiat currency units, a conversion rate, a cost basis, an exchange rate, an equivalence relationship, timestamps, any applicable keys or key references, and/or the like.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

Figure 1:
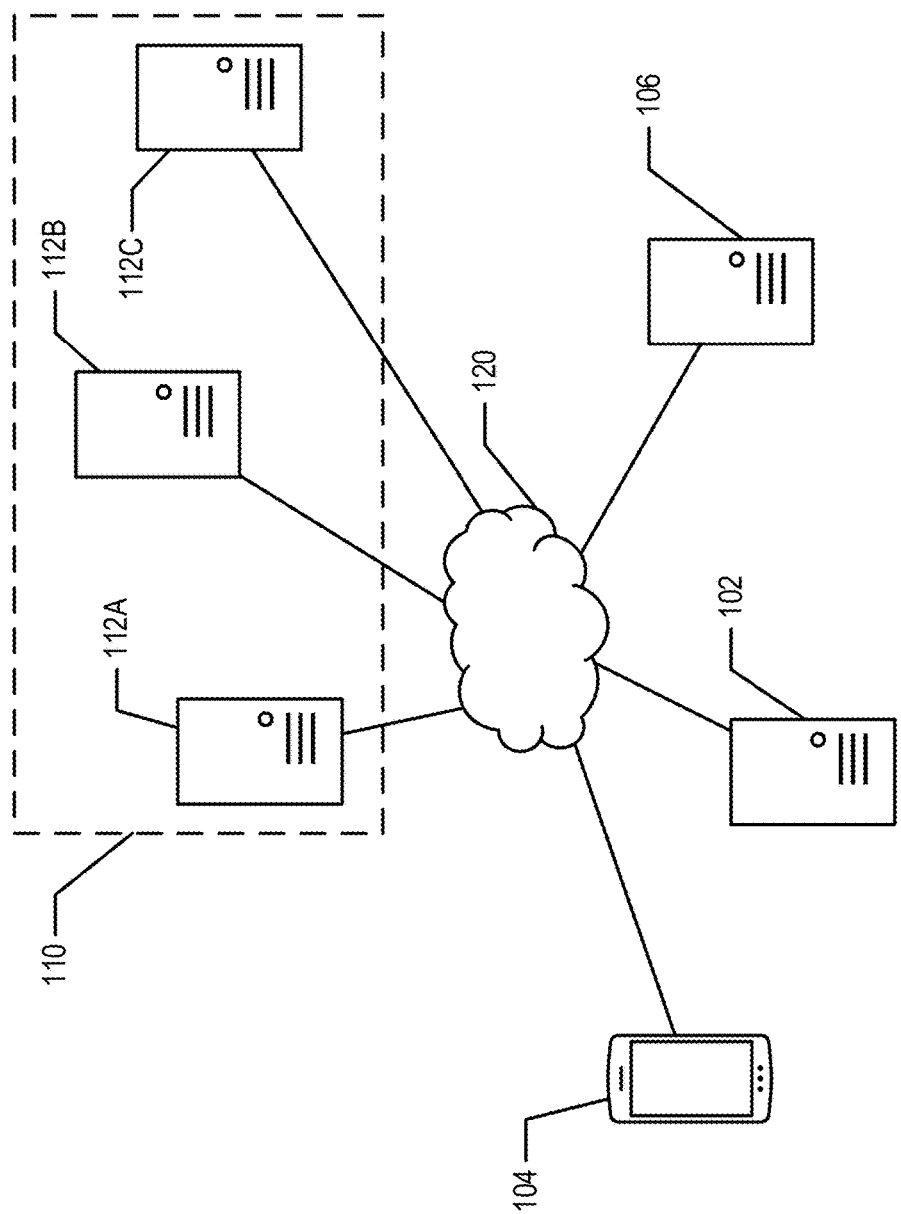
FIG. 1 is an exemplary diagram of a system that can be used to practice various embodiments of the present disclosure.

FIG. 1 provides an illustration of an architecture that can be used in conjunction with various embodiments of the present invention. As shown in FIG. 1, the architecture may comprise one or more account management systems 102, one or more client devices 104, one or more market exchange systems 106, one or more networks 120, and/or the like. As shown in FIG. 1, the system may further comprise a distributed ledger computing platform 110 comprising a plurality of node computing entities 112 (e.g., 112A, 112B, 112C). For example, in an example embodiment, the distributed ledger computing platform 110 comprises a plurality of node computing entities 112 in communication with one another via a network 120. Each of the components of the architecture may be in electronic communication with, for example, one another over the same or different wireless or wired networks 120 including, for example, a wired or wireless Personal Area Network (PAN), Local Area Network (LAN), Metropolitan Area Network (MAN), Wide Area Network (WAN), or the like. Additionally, while FIG. 1 illustrates certain systems as separate, standalone entities, the various embodiments are not limited to this particular architecture.

Although not explicitly illustrated, the account management system 102 may be a node computing entity 112 and/or may be a part of the distributed ledger computing platform 110. For example, node computing entities 112 of the distributed ledger computing platform 110 may store copies of a distributed ledger. In one embodiment, the market exchange system 106 may be a node computing entity 112 and/or be a part of the distributed ledger computing platform 110 configured to commit and retrieve portions of the distributed ledger (e.g., distributed ledger entries, distributed ledger blocks).

a. Exemplary Account Management System

In an example embodiment, an account management system 102 may be a computing entity configured for managing digital asset transactions for one or more client devices 104, such as by initiating or requesting on-chain digital asset transactions (e.g., digital asset transactions that are recorded in a distributed ledger) in coordination with one or more market exchange systems 106, and executing off-chain digital asset transactions with one or more client devices 104 and updating off-chain transaction record data objects. In various embodiments, an account management system 102 may be operated by one or more various entities for managing digital asset transactions for various client device 104. For example, an account management system 102 may be operated by banking institution entities, market exchange entities, stock exchange entities, trading platform entities, and/or the like. In various embodiments, an account management system 102 may be operated by a single such entity, while in other embodiments, an account management system 102 may host and/or be operated by multiple such entities, each managing digital asset transactions for various client devices 104.

The account management system 102 may provide a closed loop environment within which client devices 104 may purchase, sell, and/or transfer digital asset units without committing on-chain transaction record data objects describing purchases, sales, or transfers of digital asset units. As such, in various embodiments, the account management system 102 enables efficient and non-resource-intensive processing of digital asset transactions by surpassing distributed ledger on-chain transaction recording constraints. Off-chain digital asset transactions within the closed loop environment may be understood as and referred as internal digital asset transactions, off-chain (e.g., internal) digital asset transactions, off-chain transactions, closed loop transactions, internally-custodied digital asset transactions, and/or similar words used herein interchangeably. Similarly, on-chain digital asset transactions may be understood as and referred to as external digital asset transactions, external on-chain digital asset transactions, on-chain transactions, externally-custodied digital asset transactions, and/or similar words used herein interchangeably. In various embodiments, the account management system 102 may be configured to communicate with node computing entities 112. In various embodiments, the account management system 102 may also be a node computing entity 112 and communicate within the distributed ledger computing platform 110 with other node computing entities 112.

Figure 2:
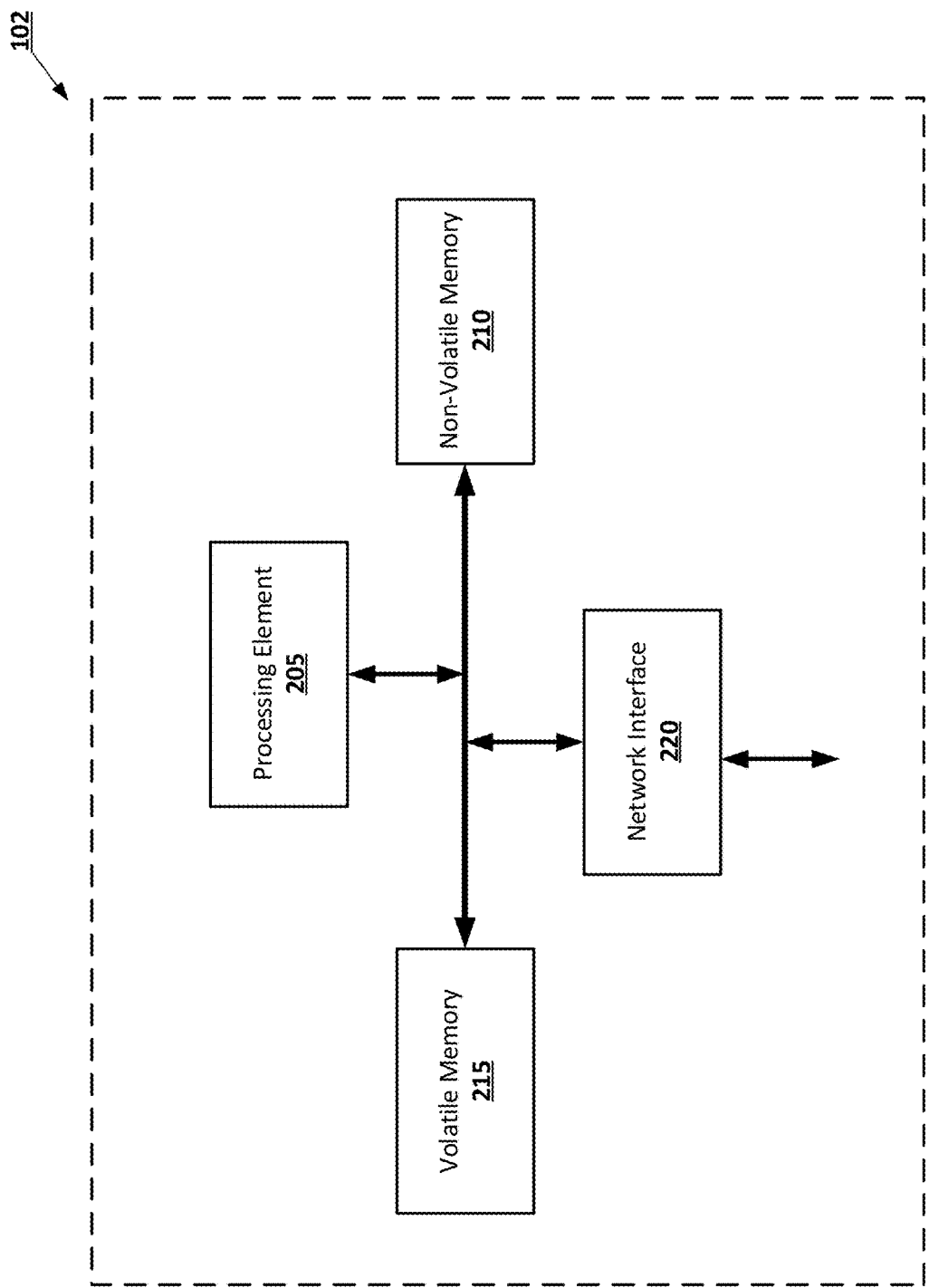
FIG. 2 is an exemplary schematic of an account management system, in accordance with certain embodiments of the present disclosure.

FIG. 2 illustrates a schematic of an example account management system 102, according to one embodiment of the present disclosure. As shown in FIG. 2, in one embodiment, the account management system 102 may include, or be in communication with, one or more processing elements 205 (also referred to as processors, processing circuitry, and/or similar terms used herein interchangeably) that communicate with other elements within the account management system 102 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the account management system 102 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the account management system 102 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the step/operation of the account management system 102 with the assistance of the processing element 205 and operating system.

As indicated, in one embodiment, the account management system 102 may also include one or more network interfaces 220 for communicating with various computing entities (e.g., one or more client devices 104, one or more market exchange systems 106, a distributed ledger computing platform 110), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the account management system 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the account management system 102 may include, or be in communication with, one or more input elements, such as a keyboard input, a mouse input, a touch screen/display input, motion input, movement input, audio input, pointing device input, joystick input, keypad input, and/or the like. The account management system 102 may also include, or be in communication with, one or more output elements (not shown), such as audio output, video output, screen/display output, motion output, movement output, and/or the like.

As indicated, the account management system 102 may be a node computing entity 112, in various embodiments. A node is an individual entity within a distributed ledger system, and can further be described as a full node (e.g., stores the entire blockchain), a mining node (e.g., full node that also maintains the blockchain by publishing updated blocks), a lightweight node (e.g., node that does not maintain a history of the entire blockchain), and/or the like. Accordingly, the account management system 102 may be in communication with one or more other node computing entities 112. In example embodiments, the account management system 102 may be in communication with one or more other node computing entities 112 configured for providing events, consensus requests, and/or the like; performing consensus processing; storing a copy of a distributed ledger; and/or the like.

b. Exemplary Client Device

Figure 3:
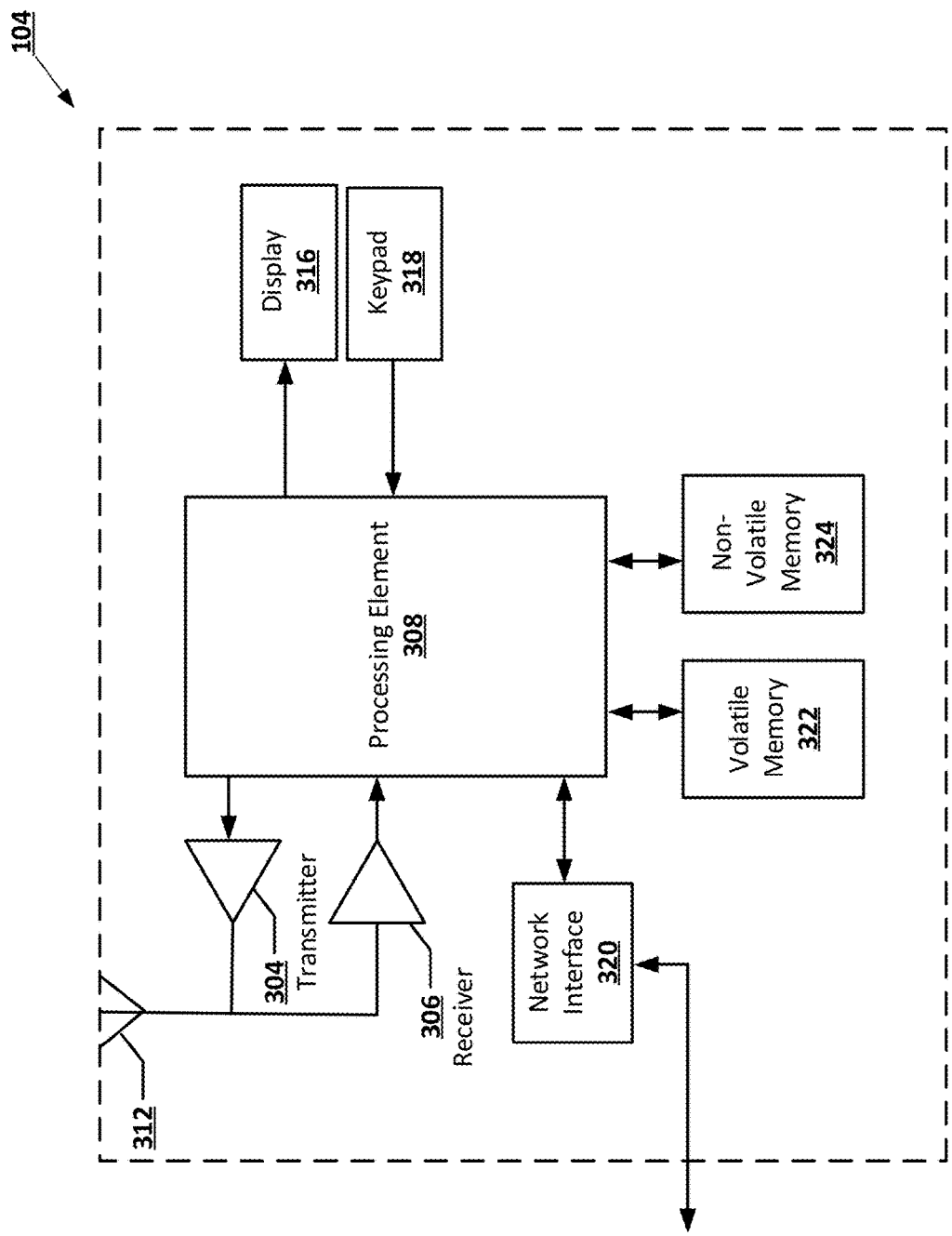
FIG. 3 is an exemplary schematic of a client device, in accordance with certain embodiments of the present disclosure.

FIG. 3 provides a schematic of an example client device 104 that may be used in conjunction with embodiments of the present disclosure. Client devices 104 can be operated by various entities, and an example architecture may include one or more client devices 104. For example, a client device 104 may be associated with, owned by, operated by, and/or the like by one or more end users. In various embodiments, an end user of a client device 104 may wish to purchase, sell, and/or transfer digital asset units, and may initiate a digital asset transaction using a client device 104. For example, a client device 104 may be a personal computing device, smartphone, tablet, laptop, personal digital assistant, and/or the like. In various embodiments, the account management system 102 may communicate with and manage digital asset transactions for one or more client devices 104. As shown in FIG. 3, the client device 104 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the account management system 102. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the account management system 102 via a network interface 320.

Via these communication standards and protocols, the client device 104 can communicate with an account management system 102 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 can also download changes, add-ons, and updates, for instance, to its firmware, software (e.g., including executable instructions, applications, program modules), and operating system.

According to one embodiment, the client device 104 may include location determining aspects, devices, modules, functionalities, and/or similar words used herein interchangeably. For example, the client device 104 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client device 104 in connection with a variety of other systems, including cellular towers, Wi-Fi access points, and/or the like. Similarly, the client device 104 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client device 104 may also comprise a user interface (that can include a display 316 coupled to a processing element 308) and/or a user input interface (coupled to a processing element 308). For example, the user interface may be a user application, app, browser, user interface, and/or similar words used herein interchangeably executing on and/or accessible via the client device 104 to interact with and/or cause display of information/data from the account management system 102, as described herein. The user input interface can comprise any of a number of devices or interfaces allowing the client device 104 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client device 104 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client device 104 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client device 104. As indicated, this may include a user application that is resident on the entity or accessible through a browser or other user interface for communicating with the account management system 102.

In another embodiment, the client device 104 may include one or more components or functionality that are the same or similar to those of the account management system 102, as described in greater detail above. As will be recognized, these architectures and descriptions are provided for exemplary purposes only and are not limiting to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Exemplary Market Exchange System

In various embodiments, the architecture (e.g., the architecture illustrated in FIG. 1) comprises one or more market exchange systems 106. In various embodiments, a market exchange system 106 may be a computing entity configured for engaging in on-chain digital asset transactions with an account management system 102. In various embodiments, a market exchange system 106 may be operated by one or more various entities that engage with on-chain digital asset transactions with an account management system 102, or entities operating an account management system 102. For example, a market exchange system 106 may be operated by banking institution entities, market exchange entities, stock exchange entities, trading platform entities, and/or the like.

Accordingly, a market exchange system 106 may be configured to at least engage in on-chain digital asset transactions with an account management system 102. In one embodiment, the market exchange system 106 may be a node computing entity 112 of a distributed ledger platform 110 and be configured to generate and commit on-chain (e.g., external) transaction record data objects to the distributed ledger. In this embodiment, the market exchange system 106 is associated with one or more digital asset accounts, digital asset addresses, distributed ledger public key values, and/or the like to and from which digital asset units may be transferred in on-chain digital asset transactions with an account management system 102. In another embodiment, the market exchange system 106 may be in communication with a distributed ledger platform 110 that manages generating and committing on-chain (e.g., external) transaction record data objects to the distributed ledger.

In various embodiments, a market exchange system 106 may be configured to store and/or have access to historical, indicative, current, and/or real-time pricing data for a digital asset. For example, a market exchange system 106 may be operated by a market entity that may generate pricing data for a digital asset based at least in part on supply models, demand models, speculative models, and/or the like. In various embodiments, the market exchange system 106 may be configured to receive pricing data API queries originating from an account management system 102 and to transmit pricing data API responses comprising historical, indicative, current, and/or real-time pricing data such that the account management system 102 receives the pricing data API responses.

Thus, a market exchange system 106 may comprise various means for performing such above described operations, functions, methods, processes and/or the like as well as other functionality for at least engaging in on-chain digital asset transactions with an account management system 102. For example, a market exchange system 106 may comprise various processing elements, volatile and/or non-volatile memory or memory media, network interfaces, user interfaces, and/or the like—include those described with regard to the account management systems 102 and/or client devices 104.

d. Exemplary Networks

In one embodiment, any two or more of the illustrative components of the architecture of FIG. 1 may be configured to communicate with one another via respective communicative couplings to one or more networks 120. The networks 120 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may include, for example, global networks (e.g., the Internet), MANs, WANs, LANs, or PANs. In addition, the networks 120 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. EXEMPLARY SYSTEM OPERATIONS

Various embodiments of the present disclosure address technical challenges related to managing digital asset transactions for client devices 104 and provide technical improvements to existing methods or systems with inefficient and resource-intensive digital asset transaction processing. For example, various embodiments comprise one or more account management systems 102 configured to initiate, request, and/or execute on-chain digital asset transactions with one or more market exchange systems 106 and to initiate, request, and/or execute off-chain digital asset transactions in a closed loop environment with one or more client devices 104. Thus, an account management system 102 may be configured to (a) initiate, request, and/or execute on-chain (e.g., external) transactions, and (b) initiate, request, and/or execute off-chain (e.g., internal) transactions. By executing off-chain digital asset transactions with client devices 104, the account management system 102 enables client devices 104 to purchase, sell, and/or transfer digital asset units in real-time in an efficient and non-resource-intensive manner by avoiding distributed ledger processing constraints. Various embodiments also determine and provide historical pricing data and current pricing data to client devices 104 based at least in part on one or more automated timing triggers, thereby enabling end users of client devices 104 to initiate well-informed and real-time digital asset transactions.

Figure 4:
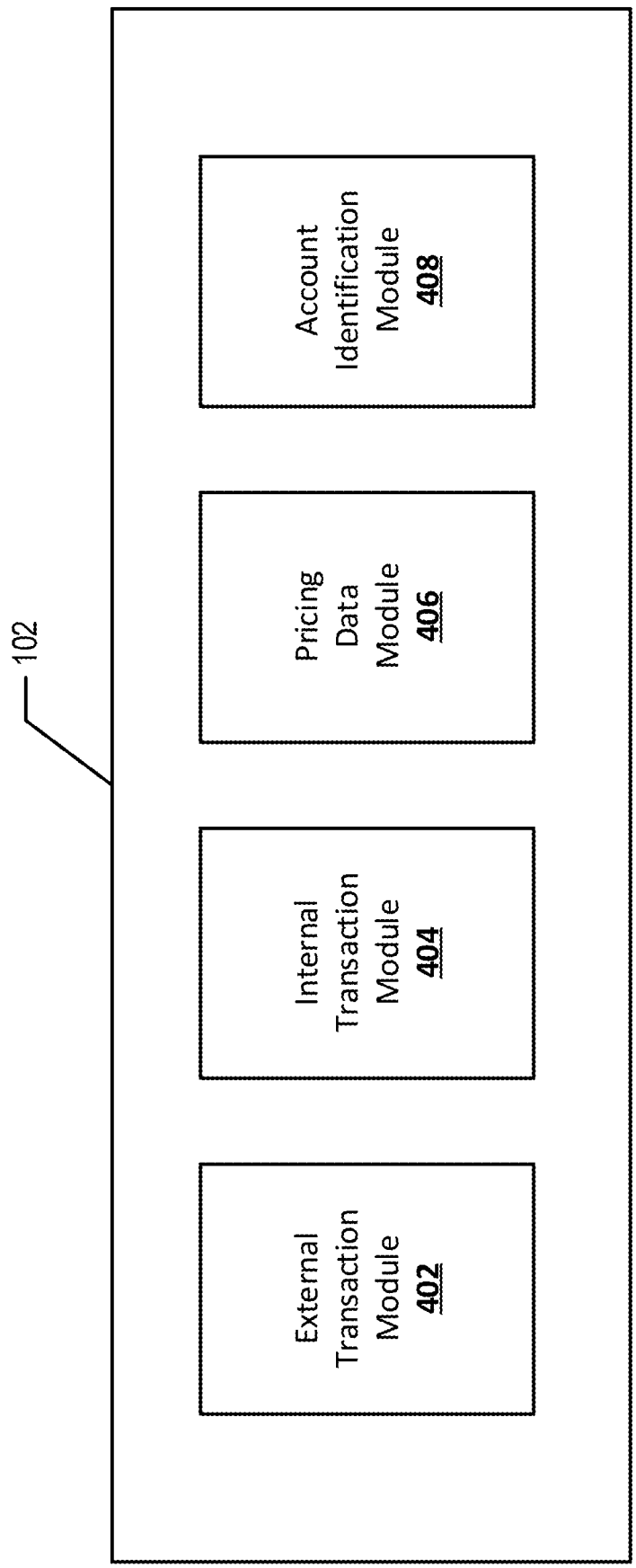
FIG. 4 is an exemplary block diagram of an account management system, in accordance with various embodiments of the present disclosure.

FIG. 4 provides a block diagram of the account management system 102. As illustrated in FIG. 4, the account management system 102 may comprise modules configured for performing various operations. For example, the account management system 102 may comprise an external transaction module 402. The external transaction module 402 may be configured to manage, initiate the execution of, request the execution of, execute, and/or similar words used herein interchangeably on-chain digital asset transactions in coordination with a market exchange system 106. Specifically, the external transaction module 402 may be configured to initiate the execution of the purchase of a number of digital asset units from a market exchange system 106 and/or initiate the execution of the sale of a number of digital asset units to a market exchange system 106. In various embodiments, the account management system 102 manages one or more central operating accounts (a) to which digital asset units purchased from a market exchange system 106 are transferred, and (b) from which digital asset units are sold to a market exchange system 106. For example, the one or more central operating accounts may comprise a digital asset central operating account.

In various embodiments, the digital asset central operating account may be a digital asset address associated with a digital asset unit balance and be used for transferring and/or receiving digital asset units associated on-chain digital asset transactions. The digital asset address (e.g., a digital asset central operating account) may be, may comprise, may be based at least in part on, and/or may represent a distributed ledger public key value possessed by the account management system 102 and/or an entity operating the account management system 102. The account management system 102 and/or an entity operating the account management system 102 may possess a distributed ledger private key value corresponding to the distributed ledger public key value. The distributed ledger private key value and the distributed ledger public key value may be related to and/or derived from each other based at least in part on a cryptographic algorithm or function. Thus, the digital asset may be a cryptoasset or a cryptocurrency, in various embodiments. In various embodiments, the distributed ledger private key value may indicate ownership of the digital asset unit balance associated with the distributed ledger public key value (e.g., the digital asset address, the digital asset central operating account) and grant authority to the account management system 102 and/or the entity operating the account management system 102 in custody of the distributed ledger private key value to initiate, request, and/or execute on-chain digital asset transactions using the digital asset unit balance.

Thus, executing an on-chain digital asset transaction may comprise generating and committing an on-chain transaction record data object via a distributed ledger platform 110. In various embodiments, the on-chain (e.g., external) transaction record data object may comprise the digital asset address of the digital asset central operating account of the account management system 102, a number of digital asset units to transact, and another digital asset address owned another entity or system and associated with a digital asset unit balance to or from which the number of digital asset units are transferred. In various embodiments, the account management system 102 executes on-chain digital asset transactions in coordination with a market exchange system 106, and therefore, the on-chain transaction record data objects for such on-chain digital asset transactions with the market exchange system 106 comprise the digital asset address owned by the account management system 102 and the digital asset address owned by the market exchange system 106.

Furthermore, the on-chain transaction record data object for an on-chain digital asset transaction may comprise a private key value signature. For example, the account management system 102 may generate an on-chain (e.g., external) transaction record data object comprising a private key value signature derived from the distributed ledger private key value owned by the account management system 102 and/or the entity operating the account management system 102 and related to the digital asset address and distributed ledger public key to or from which digital asset units are transferred in the on-chain digital asset transaction. Accordingly, each on-chain transaction record data object generated and committed comprises a private key signature indicating the authority of the account management system 102 to transfer digital asset units to and/or from the digital asset address and distributed ledger public key value. In various embodiments, the market exchange system 106 also generate the on-chain (e.g., external) transaction record data objects.

Therefore, the account management system 102 (e.g., the external transaction module 402) may be configured to initiate, request, and/or execute on-chain digital asset transactions with another entity or system (e.g., a market exchange system 106), which may comprise generating an on-chain transaction record data object comprising at least (i) a first digital asset address (e.g., the digital asset central operating account) owned by the account management system 102, (ii) a number of digital asset units, (iii) a second digital asset address owned by another entity or system (e.g., a market exchange system 106), and (iv) a private key signature derived from the distributed ledger private key related to the first digital asset address and owned by the account management system 102. In various embodiments, the account management system 102 (e.g., the external transaction module 402) and/or the market exchange system 106 are configured to relay, broadcast, transmit, and/or the like the on-chain transaction record data object to (other) node computing entities 112 of the distributed ledger computing platform 110.

In various embodiments, the account management system 102 (e.g., the external transaction module 402) may initiate, request, and/or execute an on-chain digital asset transaction (e.g., generate an on-chain transaction record data object) based at least in part on generating and transmitting a digital asset exchange API query, request, call, and/or similar words used herein interchangeably to a market exchange system 106. The digital asset exchange API query transmitted by the account management system 102 to the market exchange system 106 may represent or indicate a request for the market exchange system 106 to engage in an on-chain digital asset transaction with the account management system 102. For example, the digital asset exchange API query may include the number of digital asset units for the on-chain digital asset transaction and/or the digital asset address (e.g., the digital asset central operating account) owned by the account management system 102. In various embodiments, the digital asset exchange API query may comprise pricing data for the on-chain digital asset transaction that may indicate a number of fiat currency units to be transferred in exchange for a number of digital asset units in the on-chain digital asset transaction. In an example embodiment, the market exchange system 106 may store and/or have access to the digital asset address owned by the account management system 102, and the digital asset exchange API query may alternatively comprise an identifier for the account management system 102. In various embodiments, the market exchange system 106 may evaluate various criteria and conditions and may determine to engage in the on-chain digital asset transaction with the account management system 102. In various embodiments, the market exchange system 106 may transmit a digital asset exchange API response to the account management system 102 comprising a positive or a negative indication for engagement in the on-chain digital asset transaction and a digital asset address owned by the market exchange system 106. In some embodiments, the market exchange system 106 may generate and commit the on-chain transaction record data object for the same on-chain digital asset transaction.

Thus, in various embodiments, the account management system 102 may manage (e.g., increase or decrease) a digital asset unit balance in one or more digital asset central operating accounts via an external transaction module 402. For example, the account management system 102 (e.g., the external transaction module 402) may be configured to store and/or have access to at least a distributed ledger public key value and a distributed ledger private key value for each of one or more digital asset central operating accounts.

In various embodiments, the on-chain digital asset transaction involves the transfer a number of fiat currency units (e.g., US dollars, EU euros, Chinese yen, English pounds, and/or the like). That is, a number of digital asset units may be transferred in an on-chain digital asset transaction between an account management system 102 and a market exchange system 106 in exchange for a number of fiat currency units. For example, the on-chain purchase of a number of digital asset units from a market exchange system 106 may comprise a transfer of a number of fiat currency units from the account management system 102 to the market exchange system 106. Likewise, the on-chain sale of a number of digital asset units to a market exchange system 106 may comprise a transfer of a number of fiat currency units from the market exchange system 106 to the account management system 102. Accordingly, in various embodiments, the account management system 102 (e.g., the external transaction module 402) may manage one or more fiat currency central operating accounts and may be configured to initiate, request, and/or execute fiat currency transactions. In such embodiments, each fiat currency operating account may be associated with a fiat currency unit balance, and fiat currency units may be transferred to and/or from the one or more fiat currency central operating accounts.

In various embodiments, fiat currency units are transferred between the account management system 102 and another entity or system (e.g., market exchange system 106) engaged in an on-chain digital asset transaction. Specifically, fiat currency units may be transferred between one or more fiat currency central operating accounts associated with the account management system 102 and one or more fiat currency accounts associated with the market exchange system 106. The transfer of fiat currency units (e.g., between fiat currency central operating accounts of the account management system 102 and fiat currency accounts of the market exchange system 106) may be accomplished in various techniques or systems, such as an electronic funds transfer (EFT), a wire transfer, an Automated Clearing House transfer (ACH), and/or the like. In various embodiments, the number of fiat currency units transferred in exchange for an on-chain digital asset transaction may be determined based at least in part on current or real-time pricing data (e.g., current as of the moment in time of the execution of the on-chain digital asset transaction, current as of the moment in time of the transfer of fiat currency units). Current or real-time pricing data may indicate the current value or worth of digital asset units in relation to fiat currency units, and therefore, the number of fiat currency units may depend at least in part on the current value of digital asset units. In various embodiments, pricing data is retrieved, determined, and/or provided by the pricing data module 406. In various embodiments, fiat currency units may be transferred before, substantially concurrent with, and/or after the execution of an on-chain digital asset transaction. It may be further appreciated that references to and descriptions of an on-chain digital asset transaction herein may necessarily imply the transfer or exchange of fiat currency units as well.

Thus, the external transaction module 402 may be configured to initiate, request, and/or execute on-chain digital asset transactions, which may comprise generating and committing on-chain (e.g., external) transaction record data objects and transferring fiat currency units via a market exchange system 106 and/or distributed ledger computing platform 110. In various embodiments, the on-chain digital asset transactions may be based at least in part on various transaction constraints established by the market exchange system 106. For example, the market exchange system 106 may be configured with specific trading hours within which the market exchange system 106 may engage in on-chain digital asset transactions with the account management system 102 and outside of which the market exchange system 106 may not engage. In various embodiments, the market exchange system 106 may also enact transaction limits on on-chain digital asset transactions between the market exchange system 106 and the account management system 102.

In various embodiments, the external transaction module 402 may be configured to initiate, request, and/or execute an on-chain digital asset transaction with a market exchange system 106 upon the satisfaction of certain conditions and/or criteria, and the external transaction module 402 may be configured to monitor for such conditions. For example, the external transaction module 402 may be configured to initiate, request, and/or execute an on-chain digital asset transaction based at least in part on various factors including (i) a number of digital asset units indicated by a client device 104 for purchase or for sale, (ii) a digital asset unit balance of a digital asset central operating account, (iii) various thresholds and/or limits associated with the digital asset central operating account, (iv) the number of digital asset transaction requests received from client devices 104, and/or the like.

In various embodiments, the external transaction module 402 may evaluate the number of digital asset units indicated by the client device 104 for purchase or for sale and compare the number of digital asset units to the digital asset unit balance of a digital asset central operating account to determine if an on-chain digital asset transaction can be executed. For example, the digital asset unit balance of the digital asset central operating account may be sufficient for the purchase of a number of digital asset units by a client device 104, and as such, the external transaction module 402 may determine that an on-chain digital asset transaction does not need to be executed within a configurable time period. Accordingly, the purchase of a number of digital asset units by a client device 104 may be fulfilled or processed by an off-chain (e.g., internal) digital asset transaction based at least in part on digital asset central operating account.

In other example scenarios, the digital asset unit balance of the digital asset central operating account may be deficient or insufficient for the purchase of a number of digital asset units by a client device 104. For example, the digital asset unit balance may have an insufficient number of digital asset units allocated or set aside for fulfillment or processing of the purchase of digital asset units by the client device 104, and as such, the external transaction module 402 may initiate, request, and/or execute an on-chain digital asset transaction for a number of digital asset units based at least in part on the insufficient number of digital asset units allocated for the purchase and the number of digital asset units requested by the client device 104. As another example, the digital asset unit balance may not have any digital asset units available for fulfillment or processing of the purchase of digital asset units by the client device 104, and as such, the external transaction module 402 may initiate, request, and/or execute an on-chain digital asset transaction for a number of digital asset units based at least in part on the number of digital asset units requested by the client device 104.

Thus, the external transaction module 402 may be configured to determine whether to initiate, request, and/or execute an on-chain digital asset transaction to assist or support the fulfillment or processing of an off-chain (e.g., internal) digital asset transaction for a client device 104, and if an on-chain digital asset transaction should be executed, the number of digital asset units involved in the on-chain digital asset transaction. In various embodiments, the number of digital asset units involved in an on-chain digital asset transaction may also be based at least in part on various thresholds and/or limits for a digital asset central operating account. For example, the external transaction module 402 may configure the number of digital asset units involved when executing an on-chain digital asset transaction to maintain the digital asset unit balance above a first threshold and under a second threshold.

In general then, the external transaction module 402 may be configured to evaluate various criteria and factors to determine whether an on-chain digital asset transaction should be executed, and if so, to determine the number of digital asset units for the on-chain digital asset transaction. In various embodiments, the external transaction module 402 evaluates the various criteria and factors using a predictive model, optimization model, machine learning model, and/or the like. For example, an optimization model may be configured to determine an optimized number of digital asset units for an on-chain digital asset transaction and/or an optimized time to initiate, request, and/or execute an on-chain digital asset transaction when a plurality of digital asset transaction requests are received from various client device 104 at substantially the same time. For example, the external transaction module 402 may comprise a model configured to predict a level of digital asset transactions and initiate, request, and/or execute on-chain digital asset transactions based at least in part on peak trading and transaction hours. As an example, the external transaction module 402 evaluate the various criteria and factors to determine or predict the number of digital asset units (e.g., cryptoasset units, cryptocurrency units) and of fiat currency units (e.g., US dollars, EU euros, Chinese yen, English pounds) that should be available to the account management system 102 for on-chain transactions and/or off-chain transactions.

Thus, the account management system 102 (e.g., via the external transaction module 402) may be configured to maintain a digital asset account balance (e.g., a number of digital assets) in a digital asset central operating account at any time. A particular digital asset account balance (e.g., 100 BTC) may be maintained in the digital asset central operating account in preparation for any number of digital asset transactions requested by client devices and unit magnitudes thereof. In order to maintain a particular digital asset account balance in a digital asset central operating account, the account management system 102 may be configured to predict the digital asset account balance (or changes to the balance) for a certain and configurable time period or time point (e.g., the next 12 hours, the next day, the next week) and manage a current digital asset account balance such as by executing on-chain digital asset transactions based at least in part on the predicted digital asset account balance. For example, the account management system 102 may predict that the digital asset account balance of a digital asset central operating account will be decremented by 50 digital asset units over the next day and may accordingly execute an on-chain digital asset transaction for 50 digital asset units in preparation for such a predicted event.

As previously described, the account management system 102 may predict or generate such predictions for the digital asset unit balance for a digital asset central operating account using various predictive models, optimization models, machine learning models, and/or the like. The account management system 102 may be configured to train such models based at least in part on historical transaction trends, which may be described by on-chain and off-chain transaction record data objects stored by and/or accessible by the account management system 102. Example embodiments of such on-chain and off-chain transaction record data objects are described in greater detail in the context of FIGS. 5A and 5B herein. Thus, the account management system 102 may provide on-chain and/or off-chain transaction record data objects to various models in order to predict a future digital asset unit balance for the digital asset central operating account. In some embodiments, the account management system 102 may provide on-chain and/or off-chain transaction record data objects associated with a specific time period to the various models. For example, the account management system 102 may provide on-chain and/or off-chain transaction record data objects associated with the last week (e.g., description on-chain and off-chain transactions executed and/or requested in the last week) to the various models.

In some embodiments, training and use of the various models may additionally or alternatively be based at least in part on pricing data. For example, the account management system 102 may provide current pricing data to the various models in order to predict a volume or demand for off-chain digital asset transactions. In various embodiments, the on-chain and the off-chain transaction record data objects describe the pricing data at which the corresponding transactions were executed, and thus, the various models may use the on-chain and the off-chain transaction record data objects to predict a volume or demand for off-chain digital asset transactions (and by extension a predicted future digital asset unit balance for the digital asset central operating account) with respect to pricing data.

In various embodiments, the account management system 102 may additionally or alternatively determine a predicted digital asset unit balance for the digital asset central operating account based at least in part on current transaction activity within a current (and configurable) time period. For example, the account management system 102 may receive a number of off-chain transaction requests within the past hour and extrapolate the number (and a total amount of digital asset units requested) to determine whether the digital asset unit balance of the central operating account is sufficient for a future time period. Accordingly, in various embodiments, the account management system 102 trains various models to predict a future digital asset unit balance for a digital asset central operating account and obtains (e.g., receives) predictions of the same via the various trained models.

Similar to the external module, as illustrated in FIG. 4, the account management system 102 may comprise an internal transaction module 404 configured to manage and to initiate, request, and/or execute off-chain digital asset transactions, off-chain (e.g., internal) transactions, transactions under custody of the account management system 102, transactions with internally-custodied digital asset units, and/or similar words used herein interchangeably. In addition to the one or more digital asset central operating accounts (e.g., digital asset addresses and/or distributed ledger public key values) and one or more first currency central operating accounts, the account management system 102 may manage a plurality of client accounts. Each client device 104 may be associated with at least one internal digital asset client account and at least one fiat currency client account. In various embodiments, the internal transaction module 404 may be configured to execute off-chain (e.g., internal) digital asset transactions between the one or more digital asset central operating accounts and various internal digital asset client accounts, thereby forming a closed loop digital asset environment. Specifically, a closed loop digital asset environment is formed as client devices 104 may only be involved in off-chain (e.g., internal) digital asset transactions with the account management system 102.

Thus, an off-chain (e.g., internal) digital asset transaction may refer to a transaction between a digital asset central operating account and an internal digital asset client account (e.g., executed between the account management system 102 and a client device 104) within the closed loop digital asset environment. Such off-chain (e.g., internal) digital asset transactions may not be recorded in a distributed ledger, and node computing entities 112 of the distributed ledger computing platform 110 are unaware of off-chain (e.g., internal) digital asset transactions. For example, from the perspective of the node computing entities 112 and the distributed ledger computing platform 110, the account management system 102 may be the custodian of 1000 Bitcoin units as a result of an on-chain digital asset transaction, but the node computing entities 112 and the distributed ledger computing platform 110 may be unaware that portions of the 1000 Bitcoin units may be distributed within the account management system 102 to various internal digital asset client accounts (e.g., owned by various client devices 104) as a result of off-chain (e.g., internal) digital asset transactions. In various embodiments, off-chain (e.g., internal) digital asset transactions may inherently be more efficient and less-resource-intensive than on-chain digital asset transactions, which are subject to various processing constraints. Furthermore, various embodiments enable client devices 104 to purchase, sell, and/or transfer digital asset via off-chain (e.g., internal) digital asset transactions without a distributed ledger public key value and a distributed ledger private key value.

In various embodiments, the account management system 102 may establish off-chain (e.g., internal) transaction hours within which off-chain (e.g., internal) transactions with client devices 104 may be executed and outside of which off-chain (e.g., internal) transactions are not executed. In various embodiments, the account management system 102 may be configured to determine off-chain (e.g., internal) transaction hours based at least in part on various such as volume of digital asset transaction requests or demand. In various embodiments, the account management system 102 may additionally establish and enact off-chain (e.g., internal) transaction limits. For example, the account management system 102 may limit client devices 104 to requesting the purchase or the sale of a number of digital asset units satisfying various off-chain (e.g., internal) transaction limits.

In various embodiments, the account management system 102 (e.g., internal transaction module 404) may be configured to execute off-chain (e.g., internal) digital asset transactions with various internal digital asset client accounts associated with various client devices 104. In various embodiments, executing an off-chain (e.g., internal) digital asset transaction comprises generating and storing an off-chain transaction record data object for each off-chain digital asset transaction. In contrast to the on-chain transaction record data object, the off-chain transaction record data object is not committed to a distributed ledger stored in node computing entities 112 of a distributed ledger computing platform 110 and/or managed by the distributed ledger computing platform 110. Further, an off-chain transaction record data object may not comprise digital asset addresses or distributed ledger public key, in various embodiments. Alternatively, an off-chain transaction record data object may comprise an identifier for the client device 104 and/or an identifier for a specific internal digital asset client account associated with the user account. In various embodiments, off-chain transaction record data objects may be stored in a centralized ledger custodied and/or managed by the account management system 102.

Referring now to FIGS. 5A and 5B, example transaction record data objects are provided. Specifically, FIG. 5A illustrates an illustrative on-chain transaction record data object 510 relevant for on-chain digital asset transactions (e.g., between the account management system 102 and a market exchange system 106). Meanwhile, FIG. 5B illustrates an illustrative off-chain transaction record data object 520 relevant for off-chain (e.g., internal) digital asset transactions (e.g., between digital asset central operating accounts and internal digital asset client accounts).

In various embodiments, an on-chain (e.g., external) transaction record data object 510 may be configured to be relayed, broadcasted, transmitted, and/or the like to node computing entities 112 and/or a distributed ledger computing platform 110. In various embodiments, an on-chain transaction record data object 510 may be configured to be added to a distributed ledger (e.g., a blockchain) by the node computing entities 112 of the distributed ledger computing platform 110.

As shown in the illustrated embodiment, an on-chain transaction record data object 510 may indicate a number or amount of digital asset units involved in a corresponding on-chain digital asset transaction and identify the sender and the recipient. Specifically, the on-chain (e.g., external) transaction record data object 510 may identify the sender and the recipient with corresponding digital asset addresses and/or distributed ledger public key values. For example, each of the sender and the recipient may own a distributed ledger public key value, and the on-chain transaction record data object 510 may comprise a digital asset address derived from the sender's distributed ledger public key value and a digital asset address derived from the recipient's distributed ledger public key value. Furthermore, an on-chain (e.g., external) transaction record data object 510 may comprise a distributed ledger private key value signature indicating authority for the on-chain digital asset transaction. For example, an on-chain transaction record data object 510 generated and committed by a sender (e.g., an account management system 102, a market exchange system 106) comprises a distributed ledger private key value signature derived from a distributed ledger private key value owned by the sender and related to the distributed ledger public key value used for identifying the sender. Likewise, an on-chain (e.g., external) transaction record data object 510 generated and committed by a recipient (e.g., a market exchange system 106 and/or distributed ledger platform 110) comprises a distributed ledger private key value signature derived from a distributed ledger private key value owned by the recipient and related to the distributed ledger public key value used for identifying the recipient.

Referring now to FIG. 5B, an off-chain transaction record data object 520 may similarly indicate a number or amount of digital asset units involved in a corresponding off-chain digital asset transaction. In various embodiments, the off-chain transaction record data object 520 may also indicate a number of fiat currency units transferred in exchange for the number of digital asset units. In various embodiments, the off-chain transaction record data object 520 comprises current pricing data used for the off-chain digital asset transaction. For example, the off-chain transaction record data object 520 may indicate a conversion rate describing the value of a digital asset unit with respect to fiat currency units at the time of the off-chain (e.g., internal) digital asset transaction.

In various embodiments, the off-chain transaction record data object 520 may comprise identifiers for various client accounts. For example, the off-chain transaction record data object 520 may identify an internal digital asset client account associated with the user account involved in the off-chain digital asset transaction and to and from which digital asset units are transferred. The off-chain transaction record data object 520 may also identify an internal/external fiat currency client account associated with the user account and to and from which fiat currency units are transferred. In various embodiments, the off-chain transaction record data object 520 comprises a federated identification token, a globally unique identifiers (GUID), a universally unique identifiers (UUID) and/or the like associated with an account or the client device 104 and configured to reference at least one internal digital asset client account and at least one fiat currency client account.

In various embodiments, the account management system 102 (e.g., the internal transaction module 404) may be configured to process a plurality of off-chain transaction record data objects and extract analytic information from the plurality of off-chain transaction record data objects 520. For example, the account management system 102 may determine the number of off-chain digital asset transactions executed within a specific time period, the number of digital asset units transferred between various digital asset central operating accounts and internal digital asset client accounts, and/or the like. Thus, the account management system 102

(e.g., the internal transaction module 404) may be configured to determine a distribution of digital asset units throughout the closed loop digital asset environment based at least in part on off-chain transaction record data objects 520. In various embodiments, the account management system 102 may be configured to identify, locate, retrieve, and/or the like off-chain transaction record data objects 520 relevant for a given client device 104 and/or a given end user operating a client device 104. For example, a client device 104 may request information for a recent off-chain (e.g., internal) transaction or multiple off-chain (e.g., internal) transactions within a time period (each involving the client device 104), and the account management system 102 (e.g., the internal transaction module 404) may be configured to generate, determine, aggregate, and/or the like such information and provide the information to the client device 104 for display.

As discussed, the internal transaction module 404 may be configured to transfer digital asset units between a digital asset central operating account and an internal digital asset client account. In various embodiments, the internal transaction module 404 executes off-chain (e.g., internal) transactions in real-time responsive to receiving a digital asset transaction request originating from a client device 104. In one embodiment, the account management system 102 executes an off-chain (e.g., internal) digital asset transaction and an on-chain digital asset transaction each in real-time to fulfill a received digital asset transaction request. For example, an account management system 102 first executes an on-chain digital asset transaction (e.g., via external transaction module 402) responsive to a digital asset transaction request for the purchase of digital asset to obtain digital asset units in a digital asset central operating account, and subsequently executes an off-chain digital asset transaction (e.g., via internal transaction module 404) to fulfill the digital asset transaction request for the purchase of digital asset by distributing digital asset units to an internal digital asset client account. In various embodiments, an on-chain digital asset transaction may be executed before, substantially concurrent with, after, in real-time with, and/or the like an off-chain digital asset transaction based at least in part on various conditions, criteria, factors, and/or the like as described herein. In any regard, the internal transaction module 404 may initiate, request, and/or execute an off-chain (e.g., internal) digital asset transaction responsive to and/or to fulfill a received digital asset transaction request.

In various embodiments, the internal transaction module 404 may initiate, request, and/or execute an off-chain digital asset transaction based at least in part on identifying an internal digital asset client account associated with a user account and/or evaluating a digital asset unit balance associated with the internal digital asset client account. For example, the sale of a number of digital asset units by a client device 104 may comprise identifying whether a digital asset unit balance of an internal digital asset client account associated with the user account is sufficient for the number of digital asset units.

Therefore, the account management system 102 (e.g., the internal transaction module 404) is advantageously configured to execute off-chain (e.g., internal) digital asset transactions such that client devices 104 and/or entities operating client devices 104 may manage ownership of digital asset units in an efficient and non-resource-intensive manner. Due to digital assets being purchased, sold, and transferred in a closed loop environment and in an off-chain manner, client devices 104 may purchase, sell, and/or transfer digital asset units without being subjected to processing constraints associated with on-chain digital asset transactions.

In various embodiments, the internal transaction module 404 may be configured to transfer fiat currency units for an off-chain digital asset transaction. That is, analogous to an on-chain digital asset transaction, a number of digital asset units may be transferred in an off-chain (e.g., internal) digital asset transaction in exchange for a number of fiat currency units. For example, the purchase of a number of digital asset units by a client device 104 may involve the transfer of a number of fiat currency units from an internal/external fiat currency client account to a fiat currency central operating account. Likewise, the sale of a number of digital asset units to a client account may involve the transfer of a number of fiat currency units from a fiat currency central operating accounts to an internal/external fiat currency client account. Accordingly, the internal transaction module 404 may be configured to store, access, and/or receive identifiers (e.g., routing numbers, account numbers) for fiat currency client accounts. In various embodiments, an internal/external fiat currency client account may not be managed or custodied by the account management system 102 and may be externally custodied by an external banking system. In various embodiments, the internal transaction module 404 may cause fiat currency units to be transferred into and out of an internal/external fiat currency client account by generating and transmitting an API query or call to an external banking system managing the internal/external fiat currency client account.

In one embodiment, the account management system 102 may comprise a pricing data module 406. In various embodiments, the pricing data module 406 may be configured to access, retrieve, determine, and/or provide historical pricing data, indicative pricing data, current or real-time pricing data, updated current or real-time pricing data, and or similar words used herein interchangeably for on-chain digital asset transactions and/or off-chain digital asset transactions. For example, the pricing data module 406 may be configured to specifically transmit a historical pricing data API query to the market exchange system 106 and receive a historical pricing data API response. Historical pricing data may comprise a plurality of conversion rates each associated with a different timepoint. Historical pricing data may comprise conversion rate trends over a time period. The pricing data module 406 may then be configured to provide the historical pricing data to one or more client devices 104. For example, conversion rate trends may be displayed on a user interface (e.g., display 316) of a client device 104. Conversion rate trends and other historical pricing data may be displayed and provided at different temporal resolutions. For example, a conversion rate trend over a one-week period, a conversion rate trend over a one month period, a conversion rate trend over a one year period, and/or a conversion rate trend over a five year period may be displayed on a client device 104. This historical pricing data may also include current or real-time pricing data.

In addition to historical pricing data, the pricing data module 406 may be configured to access, retrieve, determine, and/or provide current and/or real-time pricing data for on-chain digital asset transactions and/or off-chain digital asset transactions. Such pricing data may comprise a conversion rate, cost basis, exchange rate, equivalence relationship, and/or the like indicating a correspondence or equivalence of a digital asset unit to a fiat currency unit. For example, pricing data may indicate that one unit of Bitcoin digital asset is equivalent in worth to $50,000 US dollars. In such an example scenario, the purchase of one unit of Bitcoin involves the transfer of at least $50,000 US dollars in addition to any processing fees, service fees, convenience fees, and/or the like.

It will be understood that pricing data for a digital asset may vary over time, and as such, the pricing data module 406 may be configured to access, retrieve, determine, and/or provide current or real-time pricing data at configurable time periods or frequencies to accommodate a variety of needs and circumstances. For example, the pricing data module 406 may be configured to access, retrieve, determine, and/or provide current or real-time pricing data at 30, 60, 90, 180, and/or the like second time periods. In various embodiments, the pricing data module 406 may comprise an automated timing trigger configured to cause the pricing data module 406 to access, retrieve, determine, and/or provide current or real-time pricing data every 30, 60, 90, 180, and/or the like seconds. In some embodiments, the pricing data module 406 may access, determine, or retrieve pricing data by transmitting and/or submitting a pricing data API query to the market exchange system 106 and receiving a pricing data API response from the market exchange system 106.

In various embodiments, the current or real-time pricing data determined or retrieved by the pricing data module 406 may be available for execution of on-chain digital asset transactions and off-chain (e.g., internal) digital asset transactions for a configurable execution time period. For example, the configurable execution time period may be three minutes, five minutes, and/or the like. Accordingly, current or real-time pricing data may be provided to a client device 104, and the client device 104 may be required to transmit a digital asset transaction request to the account management system 102 within the configurable execution time period (e.g., three minutes, five minutes, and/or the like) in order to purchase or sell digital asset units for a number of fiat currency units based at least in part on the current or real-time pricing data. It may be understood then that subsequent to the configurable execution time period (e.g., three minutes, five minutes, and/or the like), the number of fiat currency units needed for purchase of digital asset units or received for sale of digital asset units may be different due to updated current or real-time pricing data.

In various embodiments, the pricing data module 406 may be configured to provide the current or real-time pricing data to a client device 104, such that the updated current or real-time pricing data is displayed, and the previous displayed pricing data is no longer displayed (along with an indication of the update or change). In various embodiments, the current or real-time pricing data is provided to a client device 104 immediately after determining the current or real-time pricing data (e.g., retrieving from market exchange system 106 via an API) and/or responsive to one or more automated timing triggers. In various embodiments, current or real-time pricing data may be provided to a client device 104 based at least in part on user account data associated with the client device 104 and/or user interactions with the client device 104. For example, the client device 104 (e.g., using user account data) may request that the pricing data module 406 provide the updated current or real-time pricing data in a notification if the updated current or real-time pricing data is different from the previous pricing data by a configurable threshold amount and/or a configurable threshold percentage. As another example, updated current or real-time pricing data may be provided and displayed by the client device 104 if a transaction request API query has already been transmitted by the client device 104 and an off-chain (e.g., internal) transaction for the client device 104 has not been executed yet. As such, an end user of the client device 104 may be informed of the updated current or real-time pricing data. And in various embodiments, the end user of the client device 104 may be prompted for an indication of approval for the updated current or real-time pricing data before the account management system 102 proceeds with executing at least an off-chain digital asset transaction (e.g., via internal transaction module 404). In various embodiments, the account management system 102 may cancel an on-chain digital asset transaction and/or an off-chain (e.g., internal) digital asset transaction for an initiated but unfulfilled digital asset transaction request based at least in part on determining updated current or real-time pricing data.

FIG. 4 further illustrates the account management system 102 comprising an account identification module 408. In various embodiments, the account identification module 408 may be configured to manage and identify (i) one or more digital asset central operating accounts, (ii) one or more fiat currency central operating accounts, (iii) a plurality of internal digital asset client accounts each associated with an account accessible via a client device 104, and (iv) a plurality of fiat currency client accounts each associated with an account accessible via a client device 104. In various embodiments, a client device 104 may be associated with at least one internal digital asset client account and at least one fiat currency client account.

In various embodiments, digital asset central operating accounts and fiat currency central operating accounts are associated with the account management system 102 (e.g., digital asset units and fiat currency units owned by the account management system 102). As previously described, a digital asset central operating account may be a digital asset address that may be, may comprise, may be based at least in part on, and/or may represent a distributed ledger public key value possessed by the account management system 102. In other words, a digital asset central operating account may be related to and identifiable by a distributed ledger public key value possessed by the account management system 102, and the account management system 102 (e.g., account identification module 408) may store and manage one or more distributed ledger public key values each associated with a digital asset central operating account. As also described previously, a distributed ledger public key value may be related to a distributed ledger private key value granting authority to execute transactions to and/or from the digital asset central operating account (e.g., digital asset unit balance associated with the digital asset address) identified by the distributed ledger public key value. Thus, in various embodiments, the account management system 102 (e.g., account identification module 408) stores and manages one or more distributed ledger private key values. The account identification module 408 may be configured to store at least the distributed ledger private key values in a secure manner such that the distributed ledger private key values are inaccessible to any other system (e.g., client device 104, market exchange system 106, node computing entities 112).

Meanwhile, the internal digital asset client accounts may not be identified by distributed ledger public key values and may instead be related to and/or identified by user account data that may include user credentials for accessing the account, global account identifiers for uniquely identifying the accounts, and/or the like. The global account identifiers may be and/or comprise federated identification tokens, GUIDs, UUIDs, and/or the like. The global account identifiers may be used to identify the respective internal client accounts to carry out transactions.

In various embodiments, the account identification module 408 may further be configured to validate the identity of users and/or entities operating client devices 104, such that information regarding an internal digital asset client account (e.g., a digital asset unit balance) may be provided to an associated client device 104. In various embodiments, the identity of a client device 104 and/or entities operating the client device 104 may be validated for each off-chain digital asset transaction involving an associated internal digital asset client account.

In various embodiments, the account identification module 408 may also be configured to manage fiat currency accounts, such as one or more fiat currency central operating accounts and a plurality of fiat currency client accounts. In various embodiments, some fiat currency accounts may be externally custodied accounts. For example, an external banking institution may be the custodian of fiat currency units owned by the account management system 102 (or entities operating account management system 102) and/or various client devices 104 (or entities operating various client devices 104). In such instances, the external banking institution may be associated with an external banking system with which the account management system 102 and/or client devices 104 may interface (e.g., via API queries and responses) for the transfer and transaction of fiat currency units custodied by the external banking institution. Thus, the account identification module 408 may be configured to interface with an external banking system, such as to retrieve externally-custodied fiat currency account information for the transfer of fiat currency units as may be necessitated by on-chain digital asset transactions and/or off-chain (e.g., internal) digital asset transactions. For example, externally-custodied fiat currency accounts may be identified by various account-specific account identifiers, such as routing numbers, account numbers, and/or the like. In various embodiments, the account identification module 408 may be configured to enable single sign-on (SSO) verification for client devices 104, such that a client devices 104 may interface with an external banking system through and/or by interfacing with the account identification module 408.

In various embodiments, some fiat currency accounts may be internally custodied accounts. In such embodiments, the account identification module 408 may store and manage account-specific identifiers for internally custodied fiat currency accounts. In various embodiments, account-specific identifiers for internally custodied fiat currency accounts may be GUIDS, UUIDS, account numbers, and/or the like. In various embodiments, the account identification module 408 may be configured to identify the at least one internal digital asset client account and the at least one fiat currency account (e.g., externally-custodied, internally-custodied) for a user account. For example, a federated identification token may be associated with user account and/or an entity operating a client device 104 and may reference and/or link the at least one internal digital asset client account and the at least one fiat currency account.

Thus, in general, the account identification module 408 may manage various digital asset accounts and fiat currency accounts using a variety of techniques and approaches. In various embodiments, the account identification module 408 may be configured to identify, locate, retrieve, and/or the like identifiers and/or information for client accounts (e.g., an internal digital asset client account and an internal/external fiat currency client account). In various embodiments, the account identification module 408 may be configured to receive and validate credentials of end users of various client devices 104. For example, the account identification module 408 may be configured to identify and validate credentials of an end user (e.g., date of birth, Social Security numbers, usernames, and/or the like), and to identify, locate, retrieve, and/or the like at least one internal digital asset client account and at least one fiat currency client account associated with and/or owned by the end user.

It will be understood that an account management system 102 may comprise various additional modules for various other tasks, functions, operations, and/or the like for managing digital asset transactions. In various embodiments, an account management system 102 may comprise a different configuration of modules for managing digital asset transactions and performing the functionality described above and herein.

Figure 6A:
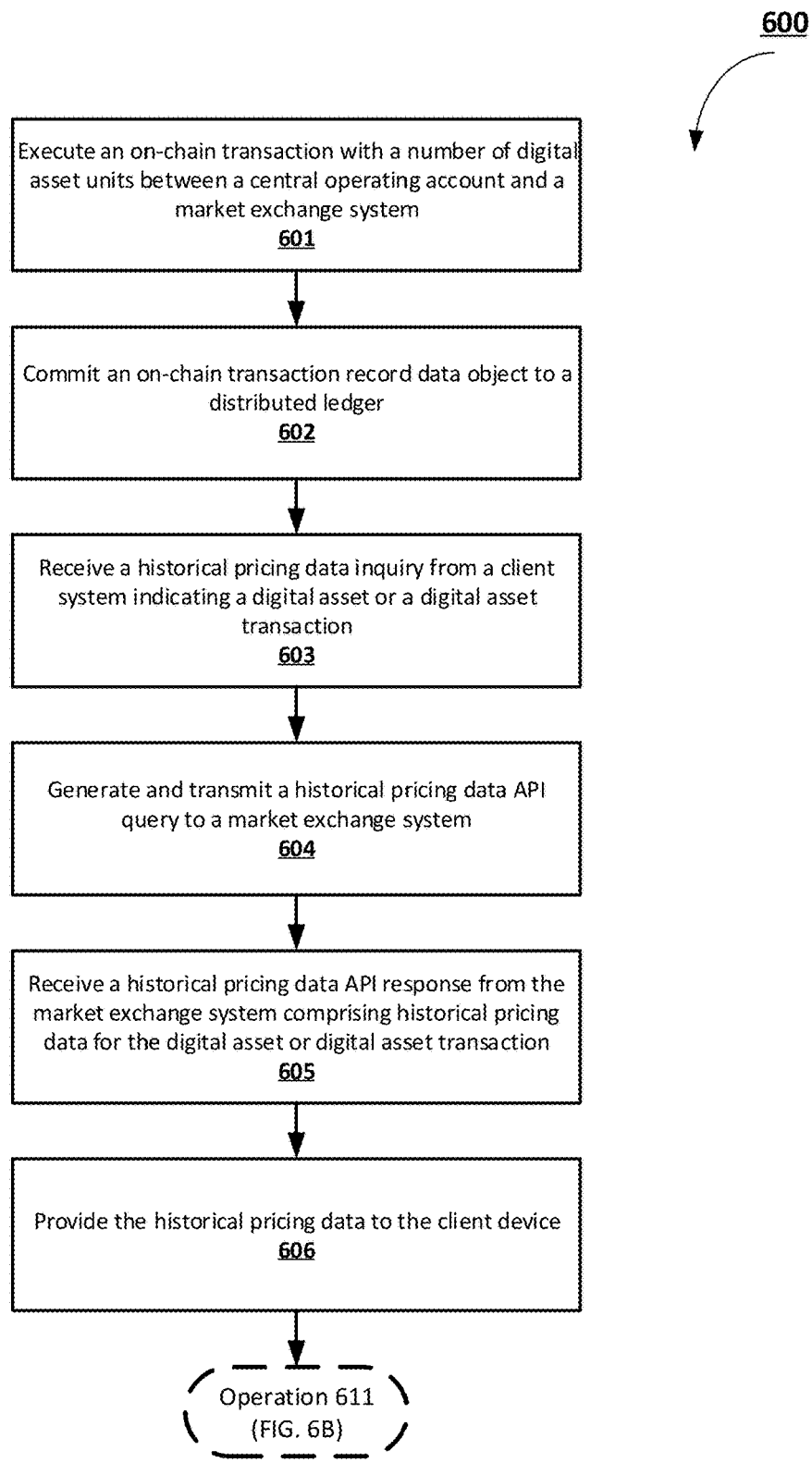

Referring now to FIG. 6A, a process 600 is provided for managing digital asset transactions. Specifically, the process 600 comprises operations for initializing a closed loop digital asset environment and providing historical pricing data to various client devices 104. In various embodiments, this may allow the account management system 102 to have access to a configurable amount of digital asset units (e.g., cryptoasset units, cryptocurrency units) for off-chain transactions. In various embodiments, the account management system 102 comprises means, such as processing element 205, memories 210, 215, network interface 220, for performing each step/operation of process 600.

Process 600 comprises step/operation 601, which comprises executing an on-chain digital asset transaction with a specified number of digital asset units between a digital asset central operating account and a market exchange system 106. In various embodiments, executing the on-chain transaction comprises generating and committing an on-chain (e.g., external) transaction record data object to a distributed ledger computing platform 110, at step/operation 602. In various embodiments, executing the on-chain digital asset transaction comprises executing the transfer of a number of fiat currency units between a fiat currency central operating account and the market exchange system 106.

In various embodiments, operations 601 and 602 may be performed to provide digital asset units for the closed loop digital asset environment, in which portions of the specified number of digital asset units may be purchased from the account management system 102 via off-chain digital asset transactions and may be returned to (e.g., sold to) the account management system 102 via off-chain (e.g., internal) digital asset transactions. In various embodiments, the specified number of digital asset units in the closed loop digital asset environment may be configurable.

Thus, from the perspective of node computing entities 112 and the distributed ledger computing platform 110, the account management system 102 is the owner of the specified number of digital asset units (e.g., cryptoasset units, cryptocurrency units), portions of which may be distributed among various internal client accounts via off-chain digital asset transactions. Thus, various client devices 104 may manage ownership of digital asset units (e.g., purchase, sell) without being subject to on-chain digital asset transaction processing constraints and without needing a distributed ledger public key value or a digital asset address.

As illustrated in FIG. 6A, process 600 comprises step/operation 603. Step/operation 603 comprises receiving a historical pricing data inquiry originating from a client device 104. In various embodiments, the historical pricing data inquiry indicates a digital asset (e.g., cryptoasset, cryptocurrency) for which the client device 104 is requesting historical pricing data. In various embodiments, the historical pricing data inquiry comprises additional information, data, parameters, and/or the like to indicate a time period for the historical pricing data. For example, the historical pricing data inquiry may indicate a request for historical pricing data for the past several minutes, past several hours, past day, past week, past month, past year, past, several years, and/or the like. As another example, the historical pricing data inquiry may indicate a start date and an end date. In various embodiments, the historical pricing data inquiry may be an API query received by the account management system 102.

Process 600 may comprise step/operation 604. Step/operation 604 comprises generating and transmitting a historical pricing data API query to a market exchange system 106. Process 600 may comprise step/operation 605, which comprises receiving a historical pricing data API response from the market exchange system 106 comprising historical pricing data for the digital asset. In various embodiments, the account management system 102 may transmit a historical pricing data API query to more than one market exchange system 106 and compare, analyze, aggregate, and/or the like historical pricing data received from different market exchange systems 106. In an example embodiment, the account management system 102 may communicate (e.g., transmit API queries and receive API responses) with a market exchange system 106 via a network 120 different from another network 120 used for communicating with various client devices 104.

Process 600 may comprise step/operation 606. Step/operation 606 comprises providing the historical pricing data to the client device 104. In various embodiments, providing the historical pricing data comprises displaying, or causing display of, the historical pricing data on a display 316 of the client device 104. In various embodiments, the historical pricing data may be provided in various formats, such as a trendline on a graph and/or the like. In various embodiments, the historical pricing data may be provided in an interactive format, where an end user of the client device 104 may interact with the historical pricing data to highlight, discover, hide, and/or the like various portions of data and information.

Therefore, process 600 may then be performed by an account management system 102 to enable a closed loop digital asset environment (e.g., by providing a specified number of digital asset units into one or more digital asset central operating accounts) and to provide historical pricing data for a digital asset to various client devices 104 to view.

FIG. 7A provides a message flow diagram illustrating steps/operations for determining pricing data for a digital asset in relation to FIGS. 6A, 6B, 6C, and 6D. As will be recognized, these may be executed and carried out with the corresponding steps/operations of FIGS. 6A, 6B, 6C, and 6D. In general, the steps/operations for determining pricing data for a digital asset illustrated in FIG. 7A may be applicable and/or be related to determining historical, indicative, current, real-time, and/or updated current or real-time pricing data. For example, the steps/operations illustrated in FIG. 7A may correspond to and/or be related to certain operations of process 600 for determining and providing historical pricing data to a client device 104.

At step/operation 702, a client device 104 transmits a pricing data inquiry and/or a transaction request API query such that an account management system 102 receives the pricing data inquiry and/or the transaction request API query. At step/operation 704, the account management system 102 transmits a pricing data API query such that a market exchange system 106 receives the pricing data API query. In various embodiments, step/operation 704 is performed responsive to step/operation 702.

At step/operation 706, the market exchange system 106 transmits a pricing data API response with the requested pricing data, such that the account management system 102 receives the requested pricing data via an API response. In various embodiments, the pricing data API response comprises pricing data for a digital asset. The pricing data for the digital asset may be historical, indicative, current, real-time, and/or updated current or real-time pricing data. At step/operation 708, the account exchange system 102 transmits the pricing data such that the client device 104 receives the pricing data for display to the end user.

Figure 6B:
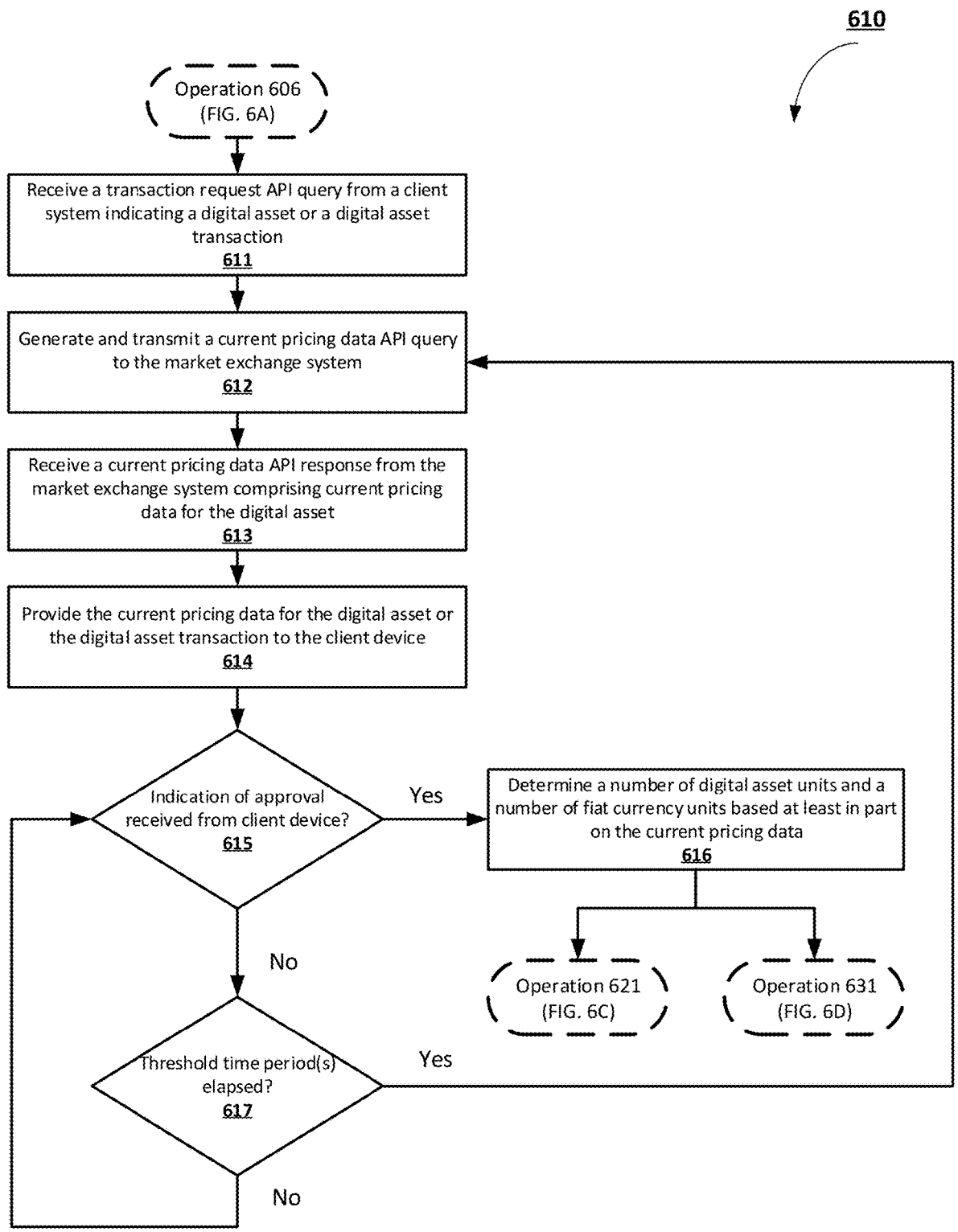

Referring now to FIG. 6B, a process 610 is provided for initiating an off-chain (e.g., internal) digital asset transaction for a user account. In various embodiments, the account management system 102 comprises means, such as processing element 205, memories 210, 215, network interface 220, and/or the like for performing each step/operation of process 610. In one non-limiting scenario, process 610 may follow process 600. For example, an end user of a client device 104 may view and examine historical pricing data for a digital asset (e.g., cryptoasset, cryptocurrency) and subsequently decide to initiate a transaction for units of the digital asset. Specifically, an end user may wish to purchase a number of digital asset units and/or to sell a number of digital asset units.

As illustrated, process 610 comprises step/operation 611 of receiving a transaction request API query from a client device 104 for a digital asset transaction. The transaction request API query may be a digital asset transaction request, as previously described herein. Returning to the previously discussed example scenario, the digital asset indicated by the transaction request API query may be the same digital asset for which historical pricing data was provided to the client device 104. In a buy example, a user may want to purchase $500 worth of BTC in the closed loop environment. In a sell example, a user may want to sell 0.2 BTC in the closed loop environment.

As illustrated, process 610 may comprise steps/operations 612 and 613 for generating and transmitting a current pricing data API query to a market exchange system 106 and subsequently receiving a current pricing data API from the market exchange system 106 comprising current pricing data for the digital asset. In various embodiments, the current pricing data for the digital asset may be associated with a timeframe within which the market exchange system 106 may engage in an on-chain digital asset transaction based at least in part on the current pricing data. In the buy example, the current pricing data may indicate a conversion rate, for example, of $125 per 0.01 BTC. Similarly, in the sell example, the current pricing data may indicate a conversion rate, for example, of $125 per 0.01 BTC.

Process 610 may comprise step/operation 614, which comprises providing the current pricing data for the digital asset to the client device 104. In various embodiments, the account management system 102 may be configured to communicate with multiple market exchange systems 106 and provide selected current pricing data to the client device 104. In various embodiments, providing the current pricing data to the client device 104 comprises displaying, or causing display of, the current pricing data on a display 316 of the client device 104. The current pricing data may be provided in an interactive notification with an approval mechanism (e.g., a selectable button). That is, in both the buy and sell examples, the conversion rate of $125 per 0.01 BTC may be displayed for the end user.

At step/operation 615 then, the account management system 102 may determine whether an indication of approval has been received from the client device 104. Specifically, the indication of approval may be an acknowledgement of the provided current pricing data. In various embodiments, the indication of approval may further confirm that an end user of the client device 104 wishes to proceed with purchasing or selling digital asset units based at least in part on the provided and approved current pricing data. Accordingly, the indication of approval may indicate a number of digital asset units or a number of fiat currency units. For example, the client device 104 and/or the entity operating the client device 104 may indicate a number of digital asset units to purchase or a number of digital asset units to sell. Alternatively, the client device 104 and/or the entity operating the client device 104 may indicate a number of fiat currency units to spend for purchasing digital asset units or a number of fiat currency units to obtain from selling digital asset units.

Thus, if an indication of approval originating from the client device 104 is received within a configurable execution time period, step/operation 616 may be performed. Step/operation 616 comprises determining a number of digital asset units and a number of fiat currency units for a digital asset transaction based at least in part on the current pricing data. In various embodiments, the determined number of digital asset units and the determined number of fiat currency units may be specific to and/or used in an off-chain digital asset transaction (and implied transfer of fiat currency units). In various embodiments, the determined number of digital asset units and the determined number of fiat currency units are based at least in part on the current pricing data and the indication of approval. For example, the indication of approval may comprise a number of digital asset units (e.g., to purchase, to sell), and a number of fiat currency units to exchange based at least in part on a conversion rate of the current pricing data and the number of digital asset units. Likewise, the indication of approval may comprise a number of fiat currency units (e.g., to obtain, to spend), and a number of digital asset units to exchange is determined based at least in part on a conversion rate of the current pricing data and the number of fiat currency units.

At step/operation 617, the account management system 102 may determine whether a configurable execution time period and/or a configurable refresh time period have elapsed based at least in part on one or more automated timing triggers. The client device 104 may be required to transmit a digital asset transaction request (e.g., request to execute the transaction) to the account management system 102 within the configurable execution time period (e.g., three minutes, five minutes, and/or the like) in order to purchase or sell digital asset units for a number of fiat currency units based at least in part on the current or real-time pricing data. For example, if the threshold time for the configurable execution time period has elapsed, the account management system 102 may perform at least steps/operations 612, 613, 614, and 615 of FIG. 6B again to determine updated current or real-time pricing data, provide the updated current or real-time pricing data to the client device 104, determine whether an indication of approval for the updated current or real-time pricing data is received, and to complete the transaction. The configurable execution time period provides the user with a configurable window within which execution of a transaction must be completed to use the current or real-time pricing data (e.g., without requiring updated current or real-time pricing data).

Similarly, the configurable refresh time period may be used to retrieve updated current or real-time pricing data for the digital asset at specific intervals to provide the end user with the current market data. For example, the one or more automated timing triggers may cause the client device 104 or the account management system 102 to determine and retrieve updated current or real-time pricing data every 30, 45, or 60 seconds (as non-limiting examples). Accordingly, if the threshold time for the configurable refresh time period has elapsed, the account management system 102 may perform at least steps/operations 612, 613, 614, and 615 of FIG. 6B again to determine updated current or real-time pricing data, provide the updated current or real-time pricing data to the client device 104, determine whether an indication of approval for the updated current or real-time pricing data is received, and to complete the transaction.

Similarly, the client device 104 (e.g., using user account data) may (a) request that the pricing data module 406 provide in a notification, and/or (b) determine whether to display the updated current or real-time pricing data if the updated current or real-time pricing data is different from the previous pricing data by a configurable threshold amount and/or a configurable threshold percentage. In the buy and sell examples, the updated current or real-time pricing data may indicate a conversion rate, for example, of $150 per 0.01 BTC (indicating a spike). If this change satisfies a configurable threshold amount (e.g., $2 USD) and/or a configurable threshold percentage (e.g., 1.3%), the updated current or real-time pricing data can be pushed out to the display to the end user to appreciate the most up-to-date information. As noted, the configurable threshold amount and/or configurable threshold percentage are configurable. Accordingly, an end user of the client device 104 may be informed of the updated current or real-time pricing data. And in various embodiments, the end user of the client device 104 may be prompted for an indication of approval for the updated current or real-time pricing data before the account management system 102 proceeds with executing the transaction.

As will be recognized, the configurable execution time period and/or a configurable refresh time period may continue to loop using automated triggers until a transaction is completed, a session is terminated, an app is closed, and/or the like. This may be managed by the account management system 102 and/or the respective client devices 104.

Figure 6C:
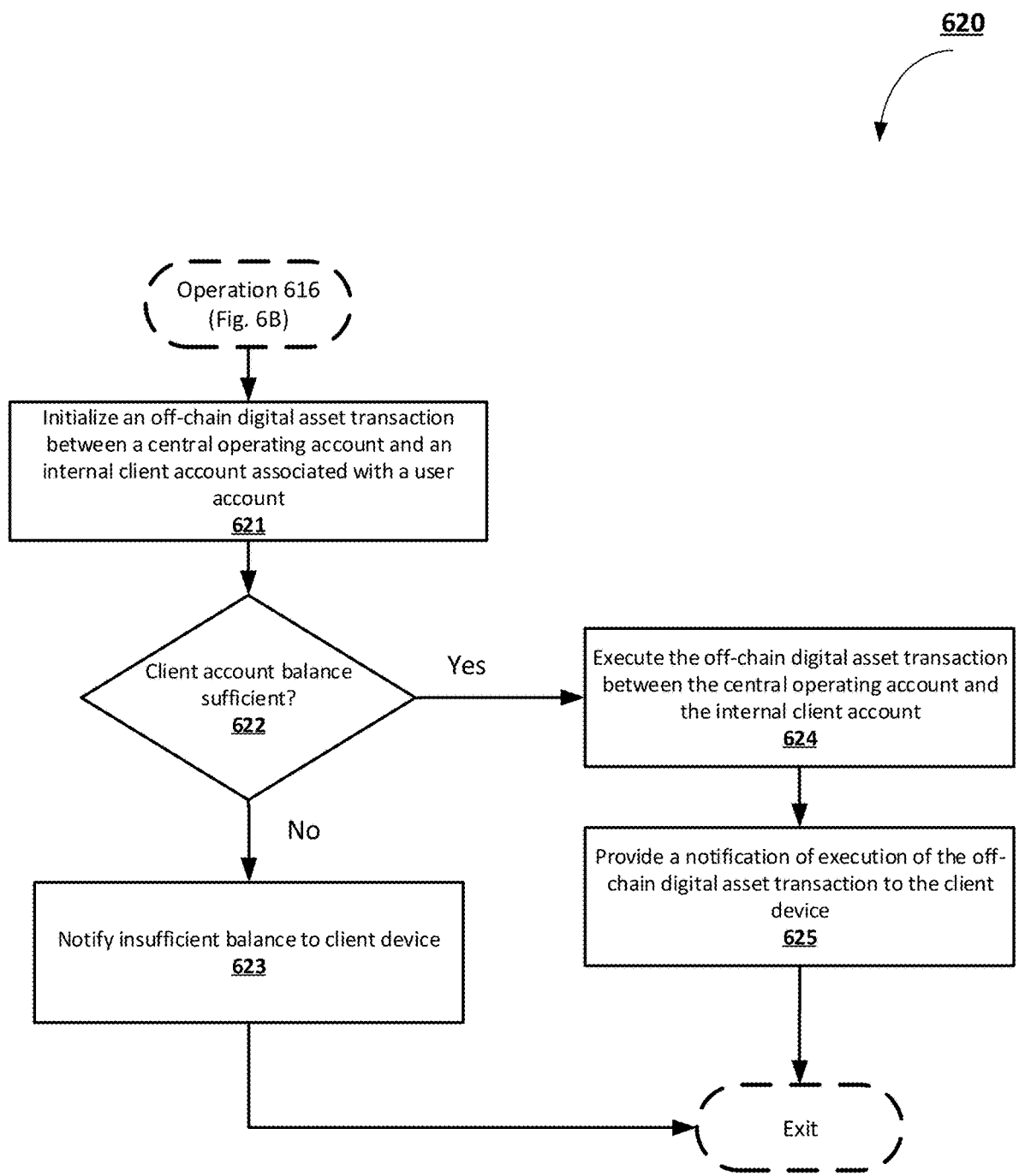

Referring now to FIG. 6C, a process 620 is provided for fulfilling or processing a digital asset transaction request based at least in part on executing at least an off-chain digital asset transaction. In various embodiments, the account management system 102 comprises means, such as processing element 205, memories 210, 215, network interface 220, and/or the like for performing each step/operation of process 620. In various embodiments, process 620 may be performed based at least in part on the account management system 102 determining that an on-chain digital asset transaction needs to be executed. For example, the account management system 102 determines that a digital asset unit balance of a digital asset central operating account is sufficient for the determined number of digital asset units. Accordingly, process 620 may involve performing an off-chain (e.g., internal) digital asset transaction in real-time to fulfill or process a digital asset transaction request originating from a client device 104 (e.g., user account).

As illustrated, process 620 comprises step/operation 621 of initializing an off-chain (e.g., internal) digital asset transaction with the determined number of digital asset units and the determined number of fiat currency units. In various embodiments, initializing the off-chain digital asset transaction may comprise identifying the entities, the digital assets, the digital asset units, the fiat currencies, the fiat currency units, a conversion rate, a cost basis, an exchange rate, an equivalence relationship, corresponding accounts, credentials or identifiers for the corresponding accounts, and/or the like.

Process 620 may comprise step/operation 622, which comprises determining whether a balance associated with one of an internal digital asset client account or an internal/external fiat currency client account associated with the user account is sufficient for the off-chain digital asset transaction. As previously noted above, in the buy example, the user may want to purchase $500 worth of BTC in the closed loop environment. And in the sell example, the user may want to sell 0.2 BTC in the closed loop environment. Thus, this step/operation may determine that there are sufficient assets to execute the transactions.

If the balance associated with one of an internal digital asset client account or an internal/external fiat currency client account is determined to be insufficient, the account management system 102 may provide a notification to the client device 104 of the insufficient balance, at step/operation 623. In various embodiments, notifying the client device 104 of the insufficient balance comprises cancelling the initiated off-chain (e.g., internal) digital asset transaction.

Otherwise, if the balance associated with one of an internal digital asset client account or an internal/external fiat currency client account is determined to be sufficient, the account management system 102 may perform step/operation 624, which comprises executing the off-chain digital asset transaction between the digital asset central operating account and the internal digital asset client account. In various embodiments, executing the off-chain (e.g., internal) digital asset transaction comprises distributing and transferring digital asset units to or from the internal digital asset client account associated with the user account. In various embodiments, executing the off-chain digital asset transaction comprises generating and storing an off-chain transaction record data object describing, indicating, and/or related to the transfer of digital asset units to or from the internal digital asset client account. As discussed, executing the off-chain (e.g., internal) digital asset transaction comprises transferring the determined number of fiat currency units between the fiat currency central operating account and the internal/external fiat currency client account. At step/operation 625, the account management system 102 may provide a notification of the execution of the off-chain digital asset transaction to the client device 104.

Continuing with the buy example, the account management system 102 debits the cost of the BTC ($500) from the user's internal/external fiat currency client account and credits the user's internal digital asset client account with the 0.4 BTC. The account management system 102 also enters a credit of $500 to the fiat currency central operating account and enters a debit of 0.4 BTC to the digital asset central operating account (e.g., generating and/or updating one or more account balance data objects). As part of this step/operation, the account management system 102 also generates, updates, and stores any necessary transaction data objects and/or account balance data objects. For example, the transaction data objects and/or account balance data objects may include the entities, the digital assets, the digital asset units, the fiat currencies, the fiat currency units, a conversion rate, a cost basis, an exchange rate, an equivalence relationship, timestamps, and/or the like. Thus, the user's and the account management system's 102 account balances are updated in real time.

And continuing with the sell example (assuming the transaction was completed prior to the automated timing trigger), the account management system 102 debits the amount of 0.2 BTC from the user's internal digital asset client account and credits $250 to the user's internal/external fiat currency client account. The account management system 102 also enters a credit of 0.2 BTC to the digital asset central operating account and a debit of $250 to the fiat currency central operating account. As part of this step/operation, the account management system 102 also generates, updates, and stores any necessary transaction data objects and/or account balance data objects. For example, the transaction data objects and/or account balance data objects may include the entities, the digital assets, the digital asset units, the fiat currencies, the fiat currency units, a conversion rate, a cost basis, an exchange rate, an equivalence relationship, timestamps, and/or the like. Thus, the user's and the account management system's 102 account balances are updated in real time.

Thus, with process 620, an account management system 102 may execute off-chain (e.g., internal) digital asset transactions in real-time with various client devices 104 without executing on-chain digital asset transactions. Thus, process 620 enables efficient and non-resource-intensive processing of digital asset transactions (e.g., purchase, sale), especially when a digital asset unit balance of a digital asset central operating account is sufficient for the off-chain digital asset transactions. In various embodiments, the account management system 102 may further monitor the digital asset unit balance of the digital asset central operating account with respect to various thresholds and/or limits. Accordingly, the account management system 102 may initiate, request, and/or execute an on-chain digital asset transaction subsequent to process 620 to maintain and manage a digital asset unit balance with respect to various thresholds and/or limits.

Figure 6D:
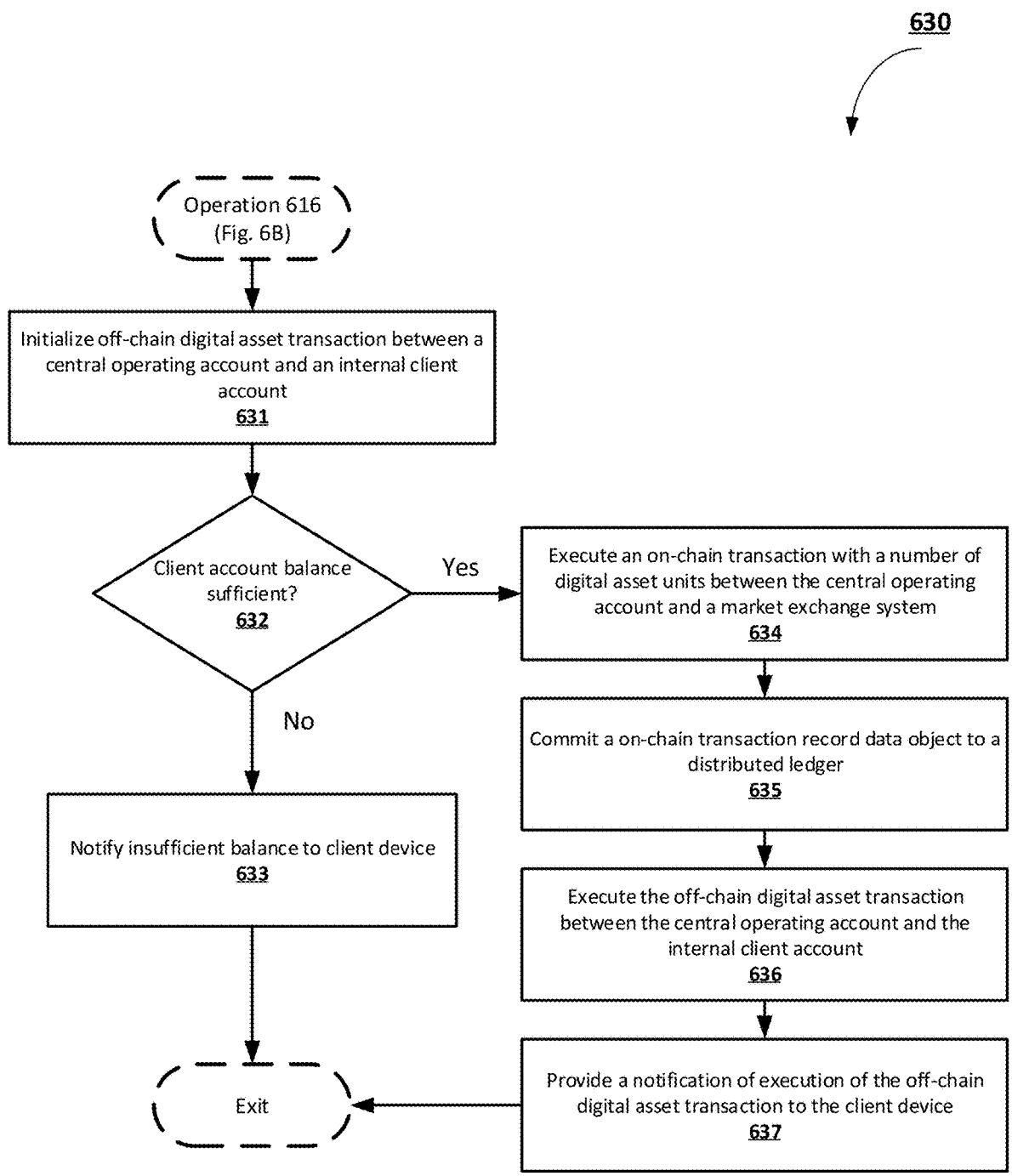

Referring now to FIG. 6D, a process 630 is provided for fulfilling or processing a digital asset transaction request originating from a client device 104 (e.g., user account) based at least in part on executing at least an off-chain (e.g., internal) digital asset transaction. In various embodiments, the account management system 102 comprises means, such as processing element 205, memories 210, 215, network interface 220, and/or the like for performing each step/operation of process 630. In various embodiments, process 630 may be performed based at least in part on the account management system 102 determining that an on-chain digital asset transaction should be executed in order to fulfill or process the digital asset transaction request. For example, the account management system 102 may determine that a digital asset unit balance (or an allocated number of digital asset units of the digital asset unit balance) of a digital asset central operating account may be deficient or insufficient for the determined number of digital asset units, and an on-chain digital asset transaction needs to be executed. For example, the account management system 102 may determine (e.g., via a predictive model, optimization model, machine learning model, and/or the like) that an on-chain digital asset transaction should be executed based at least in part on a predicted volume of digital asset transaction requests. Thus, in various embodiments, the account management system 102 predicts or generates a prediction for a future digital asset unit balance of the digital asset central operating account based at least in part on the requested off-chain cryptocurrency transaction and/or other requests received from other client devices 104. The account management system 102 may comprise, communicate with, and/or use various predictive models, optimization models, machine learning models, and/or the like to generate such predictions for a future digital asset unit balance of the digital asset central operating account and execute an on-chain digital asset transaction to maintain a present digital asset unit balance of the digital asset central operating account in preparation for the execution of one or more off-chain digital asset transactions.

As illustrated, process 630 comprises step/operation 631 of initializing an off-chain (e.g., internal) digital asset transaction with the determined number of digital asset units and the determined number of fiat currency units. In various embodiments, initializing the off-chain digital asset transaction may comprise identifying the entities, the digital assets, the digital asset units, the fiat currencies, the fiat currency units, a conversion rate, a cost basis, an exchange rate, an equivalence relationship, corresponding accounts, credentials or identifiers for the corresponding accounts, and/or the like.

Process 630 may comprise step/operation 632, which comprises determining whether a balance associated with one of an internal digital asset client account or an internal/external fiat currency client account associated with the user account is sufficient for the off-chain digital asset transaction. Similar to the previous buy example, a user may want to purchase $500 worth of BTC in the closed loop environment. And similar to the previous sell example, the user may want to sell 0.2 BTC in the closed loop environment. Thus, this step/operation may determine that there are sufficient assets to execute the transactions.

If the balance associated with one of an internal digital asset client account or an internal/external fiat currency client account is determined to be insufficient, the account management system 102 may provide a notification to the client device 104 of the insufficient balance, at step/operation 633. In various embodiments, notifying the client device 104 of the insufficient balance comprises cancelling the initiated off-chain (e.g., internal) digital asset transaction.

Otherwise if the balance associated with one of an internal digital asset client account or an internal/external fiat currency client account is determined to be sufficient, the account management system 102 may perform step/operation 634, which comprises executing an on-chain digital asset transaction. The on-chain digital asset transaction may be between a digital asset central operating account and a market exchange system 106. As previously described, executing an on-chain digital asset transaction may comprise generating and committing an on-chain transaction record data object to a distributed ledger at step/operation 635. This on-chain transaction is executed to cover the user's request if there are insufficient assets in the closed loop environment and/or to maintain a configurable digital asset unit balance in the digital asset central operating account. The on-chain transaction data object may include the entities, the digital assets, the digital asset units, the fiat currencies, the fiat currency units, a conversion rate, a cost basis, an exchange rate, an equivalence relationship, timestamps, any applicable keys or key references, and/or the like. Step/operation 635 may also comprise and/or may involve an exchange of fiat currency units between a fiat currency central operating account and the market exchange system 106.

As aforementioned, the account management system 102 may execute the on-chain digital asset transaction before the execution of various off-chain digital asset transactions in a predictive manner based at least in part on various predictive models, optimization models, machine learning models, and/or the like. Such models may be trained and may generate predictions for the digital asset unit balance of the digital asset central operating account based at least in part on on-chain and/or off-chain transaction record data objects, each associated with a historical time point and thereby describing transaction behavior, demand, volume, and/or the like over a time period. The on-chain and/or off-chain transaction record data objects may also describe pricing data at which corresponding transactions were executed, and thus, the models may generate predictions for the digital asset unit balance of the digital asset central operating account with respect to pricing data. The account management system 102 may also use current transaction activity (e.g., a number of off-chain transaction requests received in the last hour, a total number of digital asset units purchased by end users within the last day) to determine a predicted digital asset unit balance of the digital asset central operating account and determine whether or not to execute an on-chain digital asset transaction. Thus, using such models, the account management system 102 may determine one or more predictions for a future digital asset unit balance for the digital asset central operating account and execute an on-chain digital asset transaction based at least in part on the one or more predictions in steps/operations 634 and 635.

In various embodiments, the account management system 102 may receive confirmation of the on-chain digital asset transaction from the market exchange system 106. In various embodiments, executing the on-chain digital asset transaction comprises transmitting an API call to the market exchange system 106, and confirmation of the on-chain digital asset transaction may be received via an API response originating from the market exchange system 106.

At step/operation 636, the account management system 102 may execute the off-chain digital asset transaction (e.g., initiated in step/operation 631). In various embodiments, executing the off-chain (e.g., internal) digital asset transaction comprises distributing and transferring digital asset units to or from the internal digital asset client account associated with the user account. In various embodiments, executing the off-chain digital asset transaction comprises generating and storing an off-chain transaction record data object describing, indicating, and/or related to the transfer of digital asset units to or from the internal digital asset client account. As discussed, executing the off-chain (e.g., internal) digital asset transaction comprises transferring the determined number of fiat currency units between the fiat currency central operating account and the internal/external fiat currency client account.

Continuing with the buy example, the account management system 102 debits the cost of the BTC ($500) from the user's internal/external fiat currency client account and credits the user's internal digital asset client account with the 0.4 BTC. The account management system 102 also enters a credit of $500 to the fiat currency central operating account and enters a debit of 0.4 BTC to the digital asset central operating account (e.g., generating and/or updating one or more account balance data objects). As part of this step/operation, the account management system 102 also generates, updates, and stores any necessary transaction data objects and/or account balance data objects. For example, the transaction data objects and/or account balance data objects may include the entities, the digital assets, the digital asset units, the fiat currencies, the fiat currency units, a conversion rate, a cost basis, an exchange rate, an equivalence relationship, timestamps, and/or the like. Thus, the user's and the account management system's 102 account balances are updated in real time.

And continuing with the sell example (assuming the transaction was completed prior to the automated timing trigger), the account management system 102 debits the amount of 0.2 BTC from the user's internal digital asset client account and credits $250 to the user's internal/external fiat currency client account. The account management system 102 also enters a credit of 0.2 BTC to the digital asset central operating account and a debit of $250 to the fiat currency central operating account. As part of this step/operation, the account management system 102 also generates, updates, and stores any necessary transaction data objects and/or account balance data objects. For example, the transaction data objects and/or account balance data objects may include the entities, the digital assets, the digital asset units, the fiat currencies, the fiat currency units, a conversion rate, a cost basis, an exchange rate, an equivalence relationship, timestamps, and/or the like. Thus, the user's and the account management system's 102 account balances are updated in real time.

In various embodiments, the account management system 102 may then provide a notification of the execution of the off-chain digital asset transaction to the client device 104 in step/operation 637. In various embodiments, the notification may be provided via an API response to the transaction request API query (e.g., received in step/operation 611). The notification may provide further information relevant to the client device 104 and/or an end user of the client device 104, such as an updated digital asset unit balance of the internal digital asset client account, identifiers for the internal digital asset client account and/or fiat currency client account, the conversion rate and/or pricing data used for determining the number of fiat currency units and/or the number of digital asset units, and/or the like.

Thus, with process 630, an account management system 102 may be configured to initiate, request, and/or execute off-chain digital asset transactions to fulfill and process digital asset transaction requests by client device 104, while also intelligently executing on-chain digital asset transactions to support the executed off-chain (e.g., internal) digital asset transactions. As such, process 630 also enables efficient and non-resource-intensive processing of digital asset transactions (e.g., purchase, sale) for various user accounts, while also maintaining and/or improving resiliency of digital asset central operating accounts.

FIGS. 7B and 7C provide messaging flow diagrams illustrating steps/operations for fulfilling or processing a digital asset transaction request originating from a client device 104 (e.g., user account) in relation to FIGS. 6A, 6B, 6C, and 6D. As will be recognized, these may be executed and carried out with the corresponding steps/operations of FIGS. 6A, 6B, 6C, and 6D. Referring first to FIG. 7B, a message flow is provided. In various embodiments, the message flow of FIG. 7B may be related to, may correspond to, may resemble, and/or the like steps/operations of process 620 illustrated in FIG. 6C. That is, similar to process 620, the message flow of FIG. 7B may describe steps/operations performed based at least in part on the account management system 102 determining that an on-chain digital asset transaction needs to be executed. For example, the account management system 102 determines that a digital asset unit balance of a digital asset central operating account is sufficient for a number of digital asset units indicated by the digital asset transaction request originating from a client device 104 (e.g., user account). Accordingly, the message flow provided by FIG. 7B may include an off-chain digital asset transaction executed in real-time to fulfill or process a digital asset transaction request originating from a client device 104 (e.g., user account).

At step/operation 711, the account management system 102 messages the market exchange system 106 (e.g., via an API call) for the execution of a first transaction, the first transaction being an on-chain digital asset transaction with a specified number of digital asset units. In various embodiments, executing the second transaction, or the on-chain digital asset transaction, comprises generating and committing an on-chain (e.g., external) transaction record data object to the distributed ledger. Thus, at steps/operations 712 and 713, the account management system 102 and/or the market exchange system 106 may commit an on-chain transaction record data object to the distributed ledger. As previously described, the account management system 102 and/or the market exchange system 106 may validate an on-chain transaction record data object with a private key value signature unique to the account management system 102 and/or the market exchange system 106.

At step/operation 714, the market exchange system 106 may transmit a confirmation of the first transaction, or the on-chain digital asset transaction, such that the account management system 102 receives the confirmation of the second transaction. In various embodiments, the confirmation is provided via an API response to the API call requesting the on-chain digital asset transaction (e.g., in step/operation 711). Thus, with at least steps/operations 711, 712, 713, and/or 714, a closed loop digital asset environment may be enabled by providing a specified number of digital asset units into a digital asset central operating account.

At step/operation 715, a client device 104 transmits a transaction request API query (e.g., a digital asset transaction request) such that an account management system 102 receives the transaction request API query. At step/operation 716, the account management system 102 executes a second transaction, the second transaction being an off-chain digital asset transaction. Specifically, the account management system 102 executes the second transaction based at least in part on (i) evaluating at least a number of digital asset units indicated by the transaction request API query and a digital asset unit balance associated with the digital asset central operating account, and (ii) determining that an on-chain digital asset transaction is not necessarily or immediately required to fulfill or process the transaction request API query. In various embodiments, step/operation 716 may comprise the steps/operations illustrated in FIG. 7A for determining pricing data and providing pricing data to a client device 104. Specifically, at step/operation 716, current or real-time pricing data may be determined, and a number of digital asset units and a number of fiat currency units for the off-chain (e.g., internal) digital asset transaction may be determined and provided to the client device 104. At step/operation 717, the account management system 102 transmits a confirmation of the second transaction, or the off-chain digital asset transaction.

FIG. 7C provides a messaging flow diagram illustrating steps/operations for fulfilling or processing a digital asset transaction request originating from a client device 104 (e.g., user account). In various embodiments, the illustrated steps/operations in FIG. 7C may be related to, may correspond to, may resemble, and/or the like steps/operations of process 630 illustrated in FIG. 6C. That is, similar to process 630, the message flow of FIG. 7C may describe steps/operations performed based at least in part on the account management system 102 determining that an on-chain digital asset transaction should be executed to fulfill or process the digital asset transaction request. For example, the account management system 102 determines that a digital asset unit balance of a digital asset central operating account is deficient or insufficient for a number of digital asset units indicated by the digital asset transaction request originating from a client device 104 (e.g., user account). For example, the account management system 102 determines that an on-chain digital asset transaction should be executed to maintain a digital asset unit balance associated with a digital asset central operating account within various thresholds. Accordingly, the message flow provided by FIG. 7C may include an off-chain digital asset transaction executed in real-time and an on-chain digital asset transaction to fulfill or process a digital asset transaction request originating from a client device 104 (e.g., user account).

At step/operation 721, a client device 104 transmits a transaction request API query such that an account management system 102 receives the transaction request API query. Accordingly, the transaction request API query may indicate whether the requested transaction involves the purchase or the sale of digital asset units (and the number of units). At step/operation 722, the account management system 102 initiates a first transaction, the first transaction being an off-chain (e.g., internal) digital asset transaction. For example, various central operating accounts and client accounts may be identified, located, designated, and/or the like for the off-chain digital asset transaction. In various embodiments, step/operation 722 may comprise the steps/operations illustrated in FIG. 7A for determining pricing data and providing pricing data to a client device 104. Specifically, at step/operation 722, current or real-time pricing data may be determined, and a number of digital asset units and a number of fiat currency units for the off-chain digital asset transaction may be determined and provided to the client device 104.

At step/operation 723, the account management system 102 messages the market exchange system 106 for the execution of a second transaction, the second transaction being an on-chain digital asset transaction. For example, the account management system 102 may transmit an API call such that the market exchange system 106 receives the API call and engages in an on-chain digital asset transaction. As previously described, step/operation 723 may be performed based at least in part on the account management system 102 determining that an on-chain digital asset transaction should be executed (which may occur at step/operation 722). In various embodiments, the number of digital asset units for the on-chain digital asset transaction is determined based at least in part on various criteria and/or factors including (i) the number of digital asset units indicated by the transaction request API query, and (ii) the digital asset unit balance or an allocated number of digital asset units in the digital asset unit balance associated with a digital asset central operating account.

In various embodiments, executing the second transaction, or the on-chain digital asset transaction, comprises generating and committing an on-chain transaction record data object to the distributed ledger. Thus, at steps/operations 724 and 725, the account management system 102 and/or the market exchange system 106 may commit an on-chain transaction record data object to the distributed ledger. As previously described, the account management system 102 and/or the market exchange system 106 may validate an on-chain transaction record data object with a private key value signature unique to the account management system 102 and/or the market exchange system 106.

At step/operation 726, the market exchange system 106 may transmit a confirmation of the second transaction, or the on-chain digital asset transaction, such that the account management system 102 receives the confirmation of the second transaction. In various embodiments, the confirmation is provided via an API response to the API call requesting the on-chain digital asset transaction (e.g., in step/operation 723). In various embodiments, the account management system 102 may transmit a transaction file data object such that the market exchange system 106 receives the transaction file data object subsequent to the execution of one or more on-chain digital asset transactions. The transaction file data object may describe one or more on-chain digital asset transactions executed over a time period and may be provided to the market exchange system 106 for verification and validation. For example, the account management system 102 may be configured to transmit a transaction file data object on a daily basis.

At step/operation 727, the account management system 102 may execute the first transaction, or the off-chain (e.g., internal) digital asset transaction. Accordingly, in various embodiments, a number of digital asset units may be transferred between a digital asset central operating account and an internal digital asset client account, and a number of fiat currency units may be transferred between a fiat currency central operating account and an internal/external fiat currency client account.

At step/operation 728, the account management system 102 may transmit a confirmation of the first transaction, or the off-chain digital asset transaction, such that the client device 104 receives the confirmation the first transaction. Thus, as a result, a digital asset unit balance of the internal digital asset client account associated with the user account may reflect the purchase or the sale of digital asset units and may be provided to the client device 104.

It may be appreciated that while FIG. 7C illustrated off-chain digital asset transactions being supported by on-chain digital asset transactions (e.g., to manage the digital asset unit balance of the digital asset central operating account), such on-chain digital asset transactions may be executed any time before, substantially concurrent with, after, in response to, in real-time with, and/or the like each of steps/operations 722, 727, and 728. For example, in the illustrated embodiment, an on-chain digital asset transaction is executed after initiating an off-chain (e.g., internal) digital asset transaction and before executing the off-chain digital asset transaction. In other embodiments for example, an on-chain digital asset transaction is additionally or alternatively executed after execution of the off-chain digital asset transaction.

Having thus described various operations, processes, methods, functions, and/or the like for managing digital asset transactions, various user interfaces for controlling, initiating, executing, and/or the like such steps/operations are provided and described. In various embodiments, the user interfaces provided and described in the present disclosure are configured to be provided via a display 316 of a client device 104.

FIG. 8 provides an example user interface 800 configured for a client device 104. User interface 800 may be configured to provide pricing data for a digital asset 802 and enable an end user of a client device 104 to initiate a digital asset transaction. In the illustrated embodiment, the selected or relevant digital asset 802 is Bitcoin (indicated by acronym BTC). In various embodiments, user interface 800 enables an end user to change the selected or relevant digital asset 802 to various other digital assets (e.g., Ethereum, Ripple, Litecoin, Dogecoin, and/or the like). As illustrated, user interface 800 provides current pricing data 804 for display to an end user. For example, current pricing data 804 comprises a conversion rate indicating the value or worth of a unit of the selected digital asset 802 in relation to units of fiat currency (e.g., US dollars). In various embodiments, the client device 104 receives current pricing data 804 continuously and periodically based at least in part on an automated timing trigger and a configurable refresh time period, and the user interface 800 may be configured to update and provide an end user with updated current or real-time pricing data 804. Meanwhile, user interface 800 may provide historical pricing data 806 for display to an end user. Historical pricing data 806 may be provided in various formats, and in the illustrated embodiment, is provided as a trendline of conversion rates over time.

In various embodiments, user interface 800 comprises various historical pricing data controls 808 for viewing the historical pricing data 806. For example, in the illustrated embodiment, interaction with the historical pricing data control 808 labelled as "1M" may cause historical pricing data 806 relevant to the last month to be provided. In various embodiments, historical pricing data 806 for various time periods or time frames are stored by the client device 104, and user interaction with a historical pricing data control 808 causes corresponding historical pricing data 806 to be retrieved (e.g., from memories 322, 324). In various other embodiments, user interaction with a historical pricing data control 808 causes the client device 104 to retrieve corresponding historical pricing data 806 (e.g., via transmitting a historical pricing data inquiry and receiving the historical pricing data as described in FIGS. 6A and 7A).

In various embodiments, user interface 800 comprises various transaction controls 810. For example, user interface 800 comprises a transaction control 810A for initiating the purchase of units of the selected digital asset 802 and a transaction control 810B for initiating the sale of units of the selected digital asset 802. In various embodiments, user interaction with a transaction control 810 causes the client device 104 to transmit a transaction request API query such that an account management system 102 receives the transaction request API query. Accordingly, the transaction request API query may indicate whether the requested transaction involves the purchase or the sale of digital asset units (and the number of units).

FIG. 9 provides another user interface 900. In various embodiments, user interface 900 may be provided responsive to user interaction with a transaction control 810 in user interface 800 and subsequent to the client device 104 transmitting a transaction request API query. User interface 900 may be configured to enable an end user of the client device 104 to indicate (i) a number of digital asset units to purchase, (ii) a number of digital asset units to sell, (iii) a number of fiat currency units to spend, or (iv) a number of fiat currency units to obtain.

In various embodiments, user interface 900 provides currency type controls 902. For example, user interaction with a currency type control 902A may enable an end user to indicate a number of digital asset units to purchase or to sell, while user interaction with a currency type control 902B may enable an end user to indicate a number of fiat currency units to spend or to obtain. As illustrated, user interface 900 may also provide the current pricing data 804. In various embodiments, user interface 900 may be configured to provide updated current or real-time pricing data 804 as the client device 104 receives updated current or real-time pricing data 804 continuously and periodically. In various embodiments, user interface 900 provides a unit balance 904. The unit balance 904 may be a digital asset unit balance or a fiat currency unit balance based at least in part on whether the requested transaction involves the purchase or the sale of digital asset units (and the number of units). User interface 900 comprises unit number controls 906 for indicating (i) a number of digital asset units to purchase, (ii) a number of digital asset units to sell, (iii) a number of fiat currency units to spend, or (iv) a number of fiat currency units to obtain based at least in part on the currency type controls 902.

Referring now to FIG. 10, a user interface 1000 is provided. User interface 1000 may be configured to enable an end user of the client device 104 to approve of the current pricing data 804 and an indicated number of digital asset units or fiat currency units to send (e.g., sell, spend) or to receive (e.g., purchase, obtain). In various embodiments, user interface 1000 is provided responsive to user interaction with a unit number control 906 in user interface 900. Accordingly, user interface 1000 provides a digital asset unit indication 1002 indicating the determined number of digital asset units to purchase or to sell based at least in part on user interaction with a unit number control 906 on user interface 900 and/or current pricing data 804. User interface 1000 likewise provides a fiat currency unit indication 1004 indicating the determined number of fiat currency units to spend or to obtain based at least in part on user interaction with a unit number control 906 on user interface 900 and/or current pricing data 804. Again, user interface 1000 may also be configured to update and provide updated current or real-time pricing data 804 as the client device 104 receives updated current or real-time pricing data 804 based at least in part on an automated timing trigger and a configurable refresh time period.

User interface 1000 further comprises an approval mechanism 1006, configured to enable the end user to approve of the requested digital asset transaction. In various embodiments, user interaction with the approval mechanism 1006 causes the client device 104 to transmit an indication of approval such that an account management system 102 receives the indication of approval, as previously described. Thus, responsive to user interaction with the approval mechanism 1006, the account management system 102 may execute at least an off-chain digital asset transaction, and a digital asset unit balance associated with an internal digital asset client account owned by the end user may reflect either an increase or a decrease of digital asset units.

As will be recognized, a variety of reporting, transaction limit, compliance, tax, customer service, reconciliation functionalities and tools can also be provided via the interface of the client device 104. These functionalities and tools and tools can be configured to adapt to a variety of needs and circumstances.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating and transmitting a first current pricing data application programming interface (API) request, wherein (i) the first current pricing data API request is associated with a first transaction request at a first timepoint and an internal user account identifiable by an internal account identifier, (ii) the first current pricing data API request indicates a digital asset associated with the first transaction request, and (iii) the first transaction request indicates a first number of digital asset units;
receiving a first current pricing data API response comprising first current pricing data;
providing the first current pricing data for display via a client device;
responsive to determining that a first configurable time period has elapsed:
generating and transmitting a second current pricing data API request, wherein the second current pricing data API request indicates the digital asset,
receiving a second current pricing data API response comprising second current pricing data, and
providing the second current pricing data for display via the client device;
receiving a second transaction request, wherein the second transaction request (i) is at a second timepoint, (ii) is associated with the internal user account identifiable by the internal account identifier, and (iii) indicates a second number of digital asset units;
responsive to the second transaction request, executing an off-chain digital asset transaction in real-time for the second transaction request within a second configurable time period, wherein the off-chain digital asset transaction for the second number of digital asset units is between a central operating account and the internal user account, and wherein the off-chain digital asset transaction is executed in response to a predicted increase in demand by a machine learning model trained with a digital asset transaction dataset;
dynamically providing a notification of execution of the off-chain digital asset transaction;
generating an updated digital asset transaction dataset based on the digital asset transaction dataset and the off-chain digital asset transaction, wherein the machine learning model is retrained with the updated digital asset transaction dataset;
generating and storing an account balance data object for the off-chain digital asset transaction; and
executing an on-chain digital asset transaction with a third number of digital asset units, wherein executing the on-chain digital asset transaction comprises generating and committing an on-chain transaction record data object associated with the central operating account to a distributed ledger,
wherein (a) the on-chain digital asset transaction is executed prior to receiving the first transaction request and the second transaction request, and (b) the third number of digital asset units is determined based at least in part on a digital asset unit balance associated with the central operating account.

2. The computer-implemented method of claim 1, wherein the first configurable time period is a configurable execution time period or a configurable refresh time period.

3. The computer-implemented method of claim 2, wherein (a) the first configurable time period is a configurable refresh time period, and (b) the second current pricing data is different than the first current pricing data by a configurable threshold amount or a configurable threshold percentage.

4. The computer-implemented method of claim 1, further comprising:
generating and transmitting a first historical pricing data API request, wherein the first historical pricing data API request indicates the digital asset;
receiving a first historical pricing data API response comprising first historical pricing data; and
providing the first historical pricing data for display via the client device.

5. The computer-implemented method of claim 1, wherein the first current pricing data comprises a first conversion rate indicating a first value of a digital asset unit with respect to a flat currency unit.

6. A system comprising one or more memory storage areas and one or more processors, the system configured for:
generating and transmitting a first current pricing data application programming interface (API) request, wherein (i) the first current pricing data API request is associated with a first transaction request at a first timepoint and an internal user account identifiable by an internal account identifier, (ii) the first current pricing data API request indicates a digital asset associated with the first transaction request, and (iii) the first transaction request indicates a first number of digital asset units;
receiving a first current pricing data API response comprising first current pricing data;
providing the first current pricing data for display via a client device;
responsive to determining that a first configurable time period has elapsed:
generating and transmitting a second current pricing data API request, wherein the second current pricing data API request indicates the digital asset,
receiving a second current pricing data API response comprising second current pricing data, and
providing the second current pricing data for display via the client device;
receiving a second transaction request, wherein the second transaction request (i) is at a second timepoint, (ii) is associated with the internal user account identifiable by the internal account identifier, and (iii) indicates a second number of digital asset units;
responsive to the second transaction request, executing an off-chain digital asset transaction in real-time for the second transaction request within a second configurable time period, wherein the off-chain digital asset transaction for the second number of digital asset units is between a central operating account and the internal user account, and wherein the off-chain digital asset transaction is executed in response to a predicted increase in demand by a machine learning model trained with a digital asset transaction dataset;
dynamically providing a notification of execution of the off-chain digital asset transaction;
generating an updated digital asset transaction dataset based on the digital asset transaction dataset and the off-chain digital asset transaction, wherein the machine learning model is retrained with the updated digital asset transaction dataset;
generating and storing an account balance data object for the off-chain digital asset transaction; and
executing an on-chain digital asset transaction with a third number of digital asset units, wherein executing the on-chain digital asset transaction comprises generating and committing an on-chain transaction record data object associated with the central operating account to a distributed ledger, wherein (a) the on-chain digital asset transaction is executed prior to receiving the first transaction request and the second transaction request, and (b) the third number of digital asset units is determined based at least in part on a digital asset unit balance associated with the central operating account.

7. The system of claim 6, wherein the first configurable time period is a configurable execution time period or a configurable refresh time period.

8. The system of claim 7, wherein (a) the first configurable time period is a configurable refresh time period, and (b) the second current pricing data is different than the first current pricing data by a configurable threshold amount or a configurable threshold percentage.

9. The system of claim 6, wherein the system is further configured for:

generating and transmitting a first historical pricing data API request, wherein the first historical pricing data API request indicates the digital asset;

receiving a first historical pricing data API response comprising first historical pricing data; and providing the first historical pricing data for display via the client device.

10. The system of claim 6, wherein the first current pricing data comprises a first conversion rate indicating a first value of a digital asset unit with respect to a fiat currency unit.

11. A computer program product comprising at least one non-transitory computer-readable storage medium having computer-readable program code portions stored therein, the computer-readable program code portions comprising executable portions configured for:

generating and transmitting a first current pricing data application programming interface (API) request, wherein (i) the first current pricing data API request is associated with a first transaction request at a first timepoint and an internal user account identifiable by an internal account identifier, (ii) the first current pricing data API request indicates a digital asset associated with the first transaction request, and (iii) the first transaction request indicates a first number of digital asset units;

receiving a first current pricing data API response comprising first current pricing data;

providing the first current pricing data for display via a client device;

responsive to determining that a first configurable time period has elapsed:

generating and transmitting a second current pricing data API request, wherein the second current pricing data API request indicates the digital asset, receiving a second current pricing data API response comprising second current pricing data, and providing the second current pricing data for display via the client device;

receiving a second transaction request, wherein the second transaction request (i) is at a second timepoint, (ii) is associated with the internal user account identifiable by the internal account identifier, and (iii) indicates a second number of digital asset units;

responsive to the second transaction request, executing an off-chain digital asset transaction in real-time for the second transaction request within a second configurable time period, wherein the off-chain digital asset transaction for the second number of digital asset units is between a central operating account and the internal user account, and wherein the off-chain digital asset transaction is executed in response to a predicted increase in demand by a machine learning model trained with a digital asset transaction dataset;

dynamically providing a notification of execution of the off-chain digital asset transaction;

generating an updated digital asset transaction dataset based on the digital asset transaction dataset and the off-chain digital asset transaction, wherein the machine learning model is retrained with the updated digital asset transaction dataset;

generating and storing an account balance data object for the off-chain digital asset transaction; and executing an on-chain digital asset transaction with a third number of digital asset units, wherein executing the on-chain digital asset transaction comprises generating and committing an on-chain transaction record data object associated with the central operating account to a distributed ledger, wherein (a) the on-chain digital asset transaction is executed prior to receiving the first transaction request and the second transaction request, and (b) the third number of digital asset units is determined based at least in part on a digital asset unit balance associated with the central operating account.

12. The computer program product of claim 11, wherein (a) the first configurable time period is a configurable execution time period or a configurable refresh time period.

13. The computer program product of claim 12, wherein (a) the first configurable time period is a configurable refresh time period, and (b) the second current pricing data is different than the first current pricing data by a configurable threshold amount or a configurable threshold percentage.

14. The computer program product of claim 11, wherein the computer-readable program code portions comprising executable portions are further configured for:

generating and transmitting a first historical pricing data API request, wherein the first historical pricing data API request indicates the digital asset;

receiving a first historical pricing data API response comprising first historical pricing data; and providing the first historical pricing data for display via the client device.

15. The computer program product of claim 11, wherein the first current pricing data comprises a first conversion rate indicating a first value of a digital asset unit with respect to a fiat currency unit.

\* \* \* \* \*